(12) United States Patent
Choi et al.

(10) Patent No.: US 10,200,705 B2
(45) Date of Patent: Feb. 5, 2019

(54) ELECTRONIC DEVICE AND OPERATING METHOD THEREOF

(71) Applicant: SAMSUNG ELECTRONICS CO., LTD., Suwon-si, Gyeonggi-do (KR)

(72) Inventors: Jong-Bum Choi, Yongin-si (KR); Sungoh Kim, Suwon-si (KR); Hyunhee Park, Seoul (KR); Yongman Lee, Seongnam-si (KR); Jaemoon Kim, Uiwang-si (KR); Seulki Jang, Suwon-si (KR); Hyung-Ju Chun, Hwaseong-si (KR); Kwang-Tai Kim, Yongin-si (KR); Soohyung Kim, Hwaseong-si (KR); Dong-Hyun Yeom, Bucheon-si (KR); Kihuk Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 99 days.

(21) Appl. No.: 15/356,955

(22) Filed: Nov. 21, 2016

(65) Prior Publication Data

US 2017/0155917 A1    Jun. 1, 2017

(30) Foreign Application Priority Data

Nov. 27, 2015   (KR) .................. 10-2015-0167381

(51) Int. Cl.
*H04N 19/426* (2014.01)
*H04N 19/136* (2014.01)
(Continued)

(52) U.S. Cl.
CPC ......... *H04N 19/426* (2014.11); *G06K 9/6215* (2013.01); *H04N 19/136* (2014.11); *H04N 19/50* (2014.11)

(58) Field of Classification Search
CPC .......... H04N 13/04; H04N 13/02; H04N 9/64; H04N 13/0037; H04N 2013/0077;
(Continued)

(56) References Cited

U.S. PATENT DOCUMENTS 6,111,596 A * 8/2000 Haskell ................ H04N 13/133
348/42
6,226,407 B1 * 5/2001 Zabih ...................... G06T 7/001
382/209

(Continued)

FOREIGN PATENT DOCUMENTS

KR   10-2012-0133710    12/2012
KR   10-1295782          8/2013

*Primary Examiner* — Dramos Kalapodas
(74) *Attorney, Agent, or Firm* — Nixon & Vanderhye P.C.

(57) ABSTRACT

An electronic device and an method of operating the same according to various example embodiments of the present disclosure are provided. The method may include: receiving, by first image reception circuitry of a first image reception unit, first image data corresponding to a first attribute parameter; receiving, by second image reception circuitry of a second image reception unit, second image data corresponding to a second attribute parameter; detecting converted image data from the first image data based on a difference in component between the first attribute parameter and the second attribute parameter; and generating compressed image data for the second image data using the converted image data.

20 Claims, 29 Drawing Sheets

(51) Int. Cl.
*G06K 9/62* (2006.01)
*H04N 19/50* (2014.01)

(58) Field of Classification Search
CPC ............. H04N 13/0055; H04N 19/597; H04N 19/136; H04N 19/426; G06K 9/6215
See application file for complete search history.

(56) References Cited

U.S. PATENT DOCUMENTS

| | | | |
|---|---|---|---|
| 6,473,531 B1 * | 10/2002 | Kunitake | H04N 1/41 375/E7.138 |
| 7,096,481 B1 * | 8/2006 | Forecast | H04N 21/23406 348/E5.008 |
| 8,125,528 B2 * | 2/2012 | Lee | H04N 5/23248 348/208.99 |
| 8,451,320 B1 | 5/2013 | Cole et al. | |
| 8,711,943 B2 | 4/2014 | Rossato et al. | |
| 9,478,054 B1 * | 10/2016 | Lewis | G06T 11/60 |
| 2003/0031371 A1 * | 2/2003 | Kato | G06T 9/00 382/239 |
| 2012/0293633 A1 * | 11/2012 | Yamato | G01C 11/06 348/47 |
| 2015/0093044 A1 * | 4/2015 | Feder | G06F 17/3028 382/284 |

* cited by examiner

| sei_payload(payloadType, payloadSize) { | C | Descriptor |
|---|---|---|
| if(payloadType == 0) | | |
|    buffering_period(payloadSize) | 5 | |
| else if(payloadType == 1) | | |
|    pic_timing(payloadSize) | 5 | |
| else if(payloadType == 2) | | |
|    pan_scan_rect(payloadSize) | 5 | |
| else if(payloadType == 3) | | |
|    filler_payload(payloadSize) | 5 | |
| else if(payloadType == 4) | | |
|    user_data_registered_itu_t_t35(payloadSize) | 5 | |
| else if(payloadType == 5) | | |
|    user_data_unregistered(payloadSize) | 5 | |
| else if(payloadType == 6) | | |
|    recovery_point(payloadSize) | 5 | |
| else if(payloadType == 7) | | |
|    dec_ref_pic_marking_repetition(payloadSize) | 5 | |
| else if(payloadType == 8) | | |
| ⋮ | | |
| else if(payloadType == 53) | | |
|    depth_sampling_info(payloadSize)/*specified in Annex I*/ | 5 | |
| else<br>   reserved_sei_message(payloadSize) | 5 | |
| if(!byte_aligned()){ | | |
|    bit_equal_to_one /*equal to 1 */ | 5 | f(1) |
|    while(!byte_aligned()) | | |
|      bit_equal_to_zero /*equal to 0 */ | 5 | f(1) |
| } | | |
| } | | |

FIG.16C

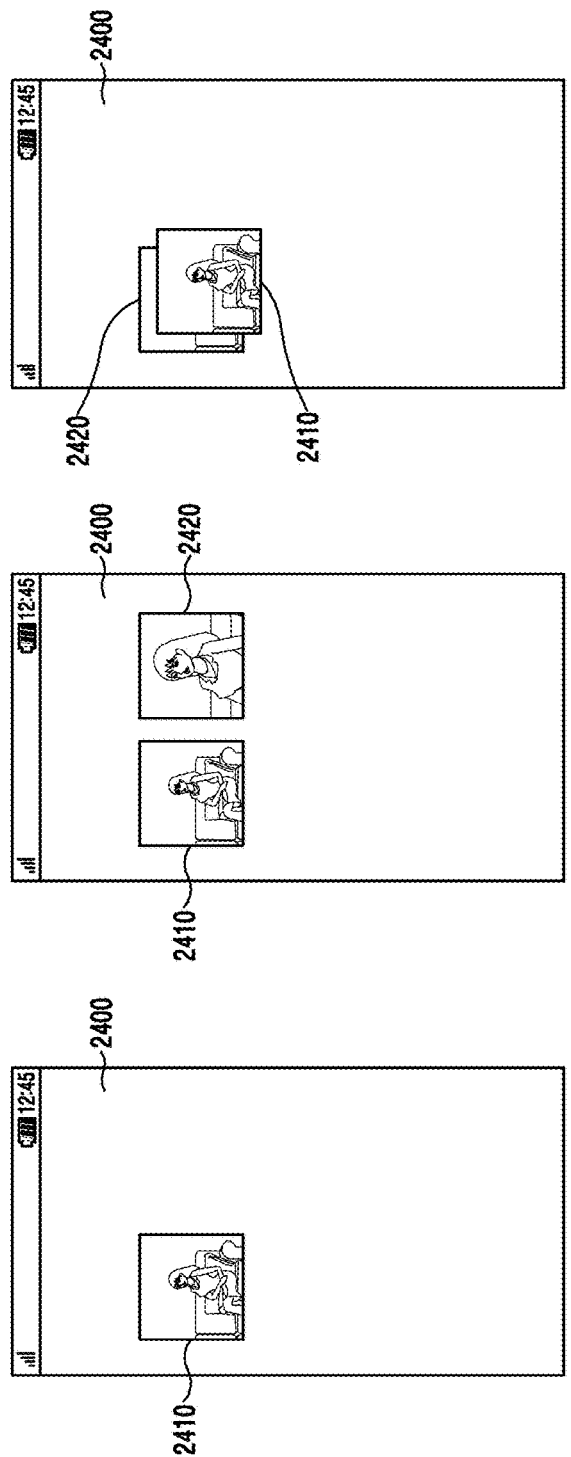

ELECTRONIC DEVICE AND OPERATING METHOD THEREOF

CROSS-REFERENCE TO RELATED APPLICATION

This application is based on and claims priority under 35 U.S.C. § 119 to Korean Application Ser. No. 10-2015-0167381, which was filed in the Korean Intellectual Property Office on Nov. 27, 2015, the disclosure of which is incorporated by reference herein in its entirety.

TECHNICAL FIELD

The present disclosure relates generally to an electronic device and an operation method thereof.

BACKGROUND

With the development of technology, an electronic device may be provided with various functions to perform complex functions. The electronic device may include a camera unit. In addition, the electronic device may photograph image data through the camera unit. Recently, the camera unit is implemented by a dual camera structure so as to photograph dual image data. In other words, the camera unit may acquire first image data and second image data. Here, the first image data and second image data may be symmetrical to each other. In addition, the camera unit may individually compress the first image data and second image data. Accordingly, the electronic device may individually store the first image data and second image data. In addition, the electronic device may synthesize the first image data and second image data.

However, in the electronic device as mentioned above, there is a problem in that the storage size for dual image data increases. The problem may occur due to the fact that the electronic device independently stores first image data and second image data. In addition, when the first image data and the second image data are asymmetrical to each other, there may be a difficulty in that the camera unit compresses the first image data and second image data. This may occur due to the fact that the camera unit compresses the first image data and second image data in the same compression scheme. Accordingly, the processing efficiency of the dual image data in an electronic device may be lowered.

SUMMARY

An electronic device according to various example embodiments may include: first image receiving circuitry configured to receive first image data corresponding to a first attribute parameter; second image receiving circuitry configured to receive second image data corresponding to a second attribute parameter; image conversion circuitry configured to detect, from the received first image data, converted image data based on a difference in component between the first attribute parameter and the second attribute parameter; and image compression circuitry configured to generate compressed image data for the received second image data using the converted image data.

An method of operating an electronic device according to various example embodiments may include: receiving first image data corresponding to a first attribute parameter and second image data corresponding to a second attribute parameter; detecting converted image data from the received first image data based on a difference in component between the first attribute parameter and the second attribute parameter; and generating compressed image data for the received second image data using the converted image data.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein:

FIGS. 13A, 13B, 14A, 14B, 14C, 15A, 15B, 15C, 16A, 16B, and 16C are diagrams illustrating an example method of operation for an electronic device according to various example embodiments of the present disclosure;

FIGS. 24A, 24B, 24C, 25A, 25B, 25C, 25D, 26A, 26B, 26C, 27A, 27B and 27C are diagrams illustrating an example method of operation of an example electronic device according to various example embodiments of the present disclosure.

DETAILED DESCRIPTION

Figure 1:
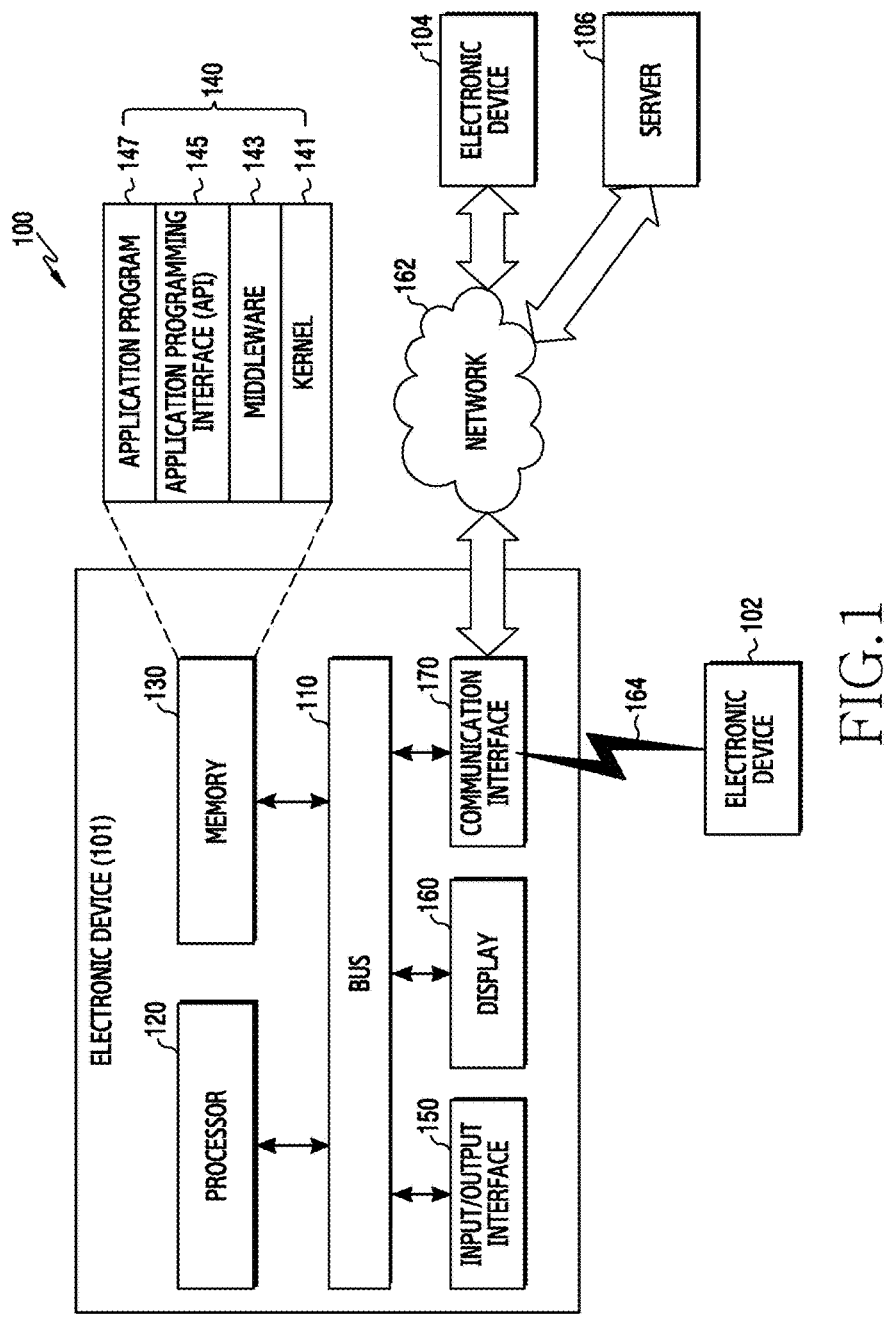
FIG. 1 is a diagram illustrating an example network environment system according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, a glasses, a contact lens, or a Head-Mounted Device (HIVID)), a fabric or clothing integrated type (e.g., an electronic clothing), a body-mounted type (e.g., a skin pad, or tattoo), and a bio-implantable type (e.g., an implantable circuit), or the like, but is not limited thereto. According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an electronic device according to various example embodiments of the present disclosure.

An electronic device 101 within a network environment 100, according to various example embodiments, will be described with reference to FIG. 1. The electronic device 101 may include a bus 110, a processor 120, a memory 130, an input/output interface (e.g., including input/output circuitry) 150, a display 160, and a communication interface (e.g., including communication circuitry) 170. In some embodiments, the electronic device 101 may omit at least one of the above elements or may further include other elements.

The bus 110 may include, for example, a circuit for connecting the elements 110 -170 and transferring communication (e.g., control messages and/or data) between the elements.

The processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may include various input/output circuitry provided to function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may include various communication circuitry configured to set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), and Global System for Mobile Communications (GSM), as a cellular communication protocol. In addition, the wireless communication may include, for example, short range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

Figure 2:
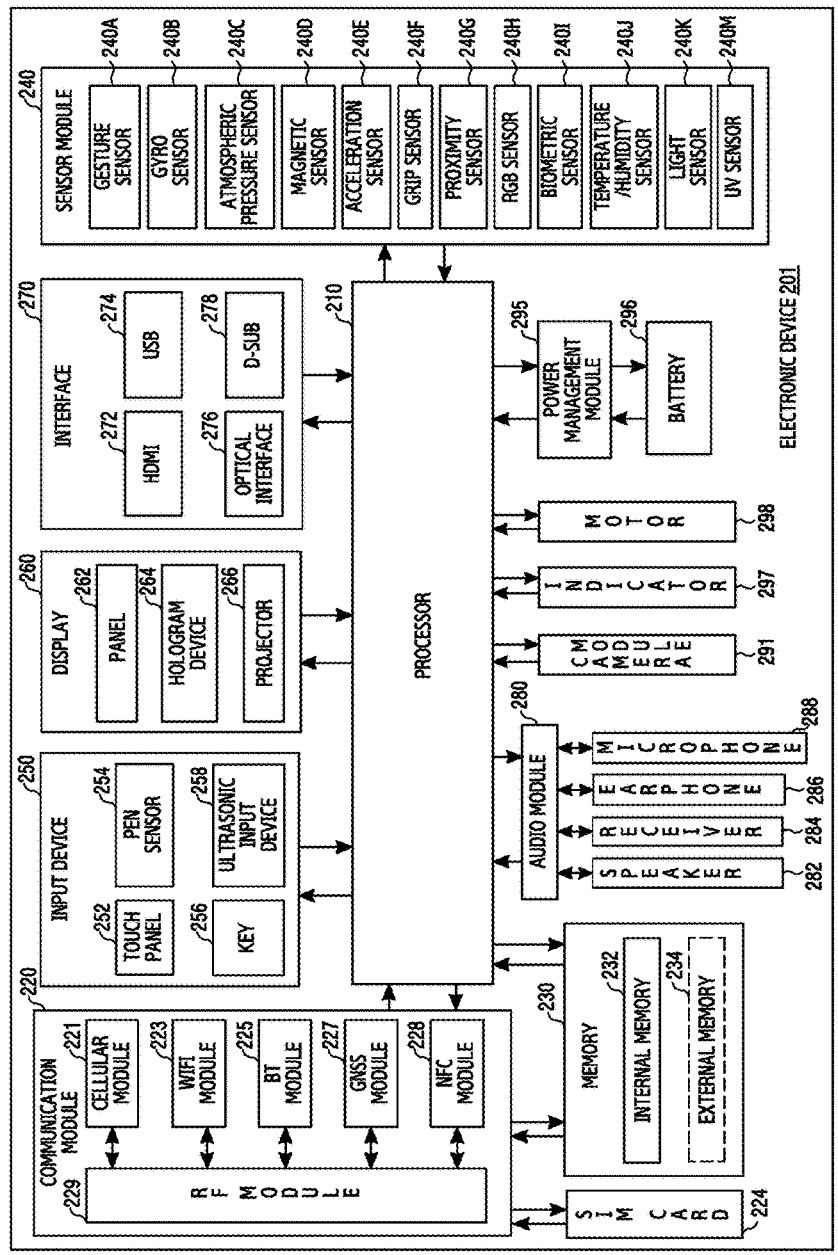
FIG. 2 is a block diagram illustrating an example electronic device according to various example embodiments of the present disclosure.

FIG. 2 is a block diagram illustrating an example electronic device according to various example embodiments of the present disclosure.

FIG. 2 is a block diagram of an electronic device 201 according to various example embodiments. For example, the electronic apparatus 201 may include the whole or part of the electronic apparatus 101 illustrated in FIG. 1. The electronic device 201 may include at least one processor (e.g., Application Processor (AP)) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include various communication circuitry, such as, for example, and without limitation, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130) may include, for example, an internal memory 232 or an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (for example, a Red/Green/Blue (RGB) sensor), a biometric sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG)

sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, inside or outside the electronic apparatus 201. According to an embodiment, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic apparatus 201 or a part (e.g., the processor 210). The motor 298 may convert an electrical signal into mechanical vibration, and may generate vibration, a haptic effect, or the like. Although not illustrated, the electronic apparatus 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
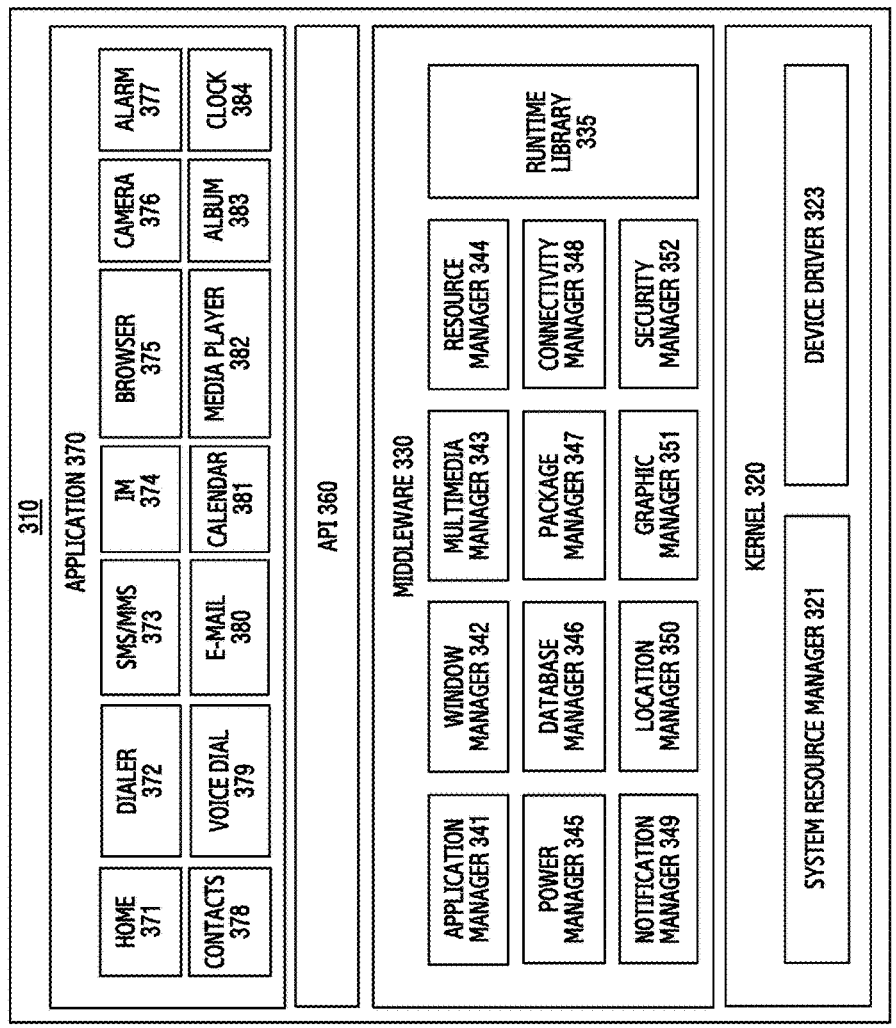
FIG. 3 is a block diagram illustrating an example program module according to various embodiments of the present disclosure.

FIG. 3 is a block diagram illustrating an example program module according to various example embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic apparatus 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus (e.g., the electronic apparatus 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic apparatus (e.g., the electronic apparatus 101) and an external electronic apparatus (e.g., the electronic apparatus 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic apparatus 102 or 104), notification information generated by other applications (e.g., an SMS/MMS application, an email application, a health care application, an environmental information application, etc.) of the electronic apparatus 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic apparatus 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of processing circuitry, an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

Figure 4:
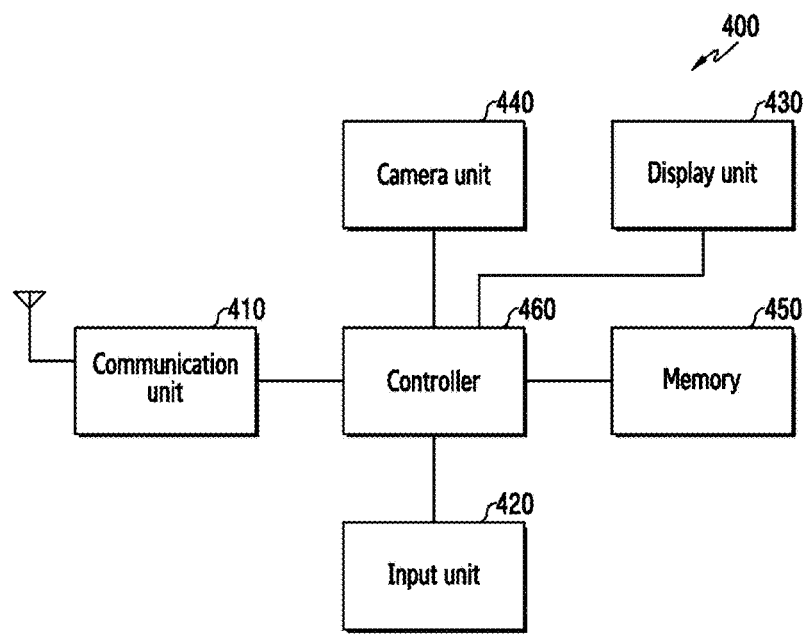
FIG. 4 is a block diagram illustrating an example electronic device according to various example embodiments of the present disclosure.

FIG. 4 is a block diagram illustrating an example electronic device according to various example embodiments of the present disclosure. In addition, FIGS. 5A, 5B, 6A and 6B are diagrams illustrating example image data according to various example embodiments of the present disclosure.

Referring to FIG. 4, an electronic device 400 according to various embodiments of the present disclosure may include a communication unit (e.g., including communication circuitry) 410, an input unit (e.g., including input circuitry) 420, a display unit (e.g., including a display) 430, a camera unit (e.g., including a camera and/or imaging circuitry) 440, a memory 450, and a controller 460.

The communication unit 410 may include various communication circuitry configured to perform communication in the electronic device 400. Here, the communication unit 410 may communicate with an external device (not illustrated) through various communication schemes. For example, the communication unit 410 may perform wired or wireless communication. To this end, the communication unit 410 may access at least one of a mobile communication network and a data communication network. Otherwise, the communication unit 410 may perform short-range communication. For example, the external device may include an electronic device, a base station, a server, and a satellite. In addition, the communication schemes may include Long Term Evolution (LTE), Wideband Code Division Multiple Access (WCDMA), Global System for Mobile Communications (GSM), Wi-Fi, wireless Local area network (wireless LAN), Bluetooth, and Near Field Communications (NFC).

The input unit 420 may include various input circuitry configured to generate input data in the electronic device 400. At this time, the input unit 420 may generate the input data to correspond to a user input of the electronic device 400. Further, the input unit 420 may include at least one input means. The input unit 420 may include various input circuitry, such as, for example, and without limitation, a key pad, a dome switch, a physical button, a touch panel, a jog & shuttle, and a sensor.

The display unit 430 may output display data from the electronic device 400. According to various embodiments, the display unit 430 may be driven by using a self-luminous phenomenon. The display unit 430 may include an Organic Light Emitting Diode (OLED) display and an Active Matrix Light Emitting Diode (AMOLD), or the like, but is not limited thereto. Here, the display unit 430 may be implemented as a touch screen while being coupled to the input unit 420.

The camera unit 440 may include a camera and/or imaging circuitry configured to photograph image data. Here, the camera unit 440 may be driven according to a predetermined attribute parameter. According to various embodiments, the attribute parameter of the camera unit 440 may be determined according to at least one of the device characteristics of the camera unit 440 or the user's settings. Therefore, when image data is acquired through the camera unit 440, the attribute parameter for the image data may be determined based on the attribute parameter of the camera unit 440. For example, the attribute parameter may include at least one of a viewing angle, a resolution, a numerical value of a color, the position of an object point, white balance, exposure, or a focal length.

According to an embodiment, the attribute parameter may be determined based on the device characteristics of the camera unit 440. For example, when the camera unit 440 is a black and white camera, the attribute parameter may include a numerical value of black and white. Alternatively, the attribute parameter may include a resolution which can be supported by the camera unit 440, for example, the minimum resolution or the highest resolution. According to another embodiment, the attribute parameter may be determined depending on the user's settings. For example, although the camera unit 440 is a color camera, if the camera unit 440 is switched to a black-and-white mode according to the user's settings, the attribute parameter may include the numerical value of black and white.

According to various embodiments, the camera unit 440 may be implemented as a dual camera structure so as to acquire dual image data. That is, the camera unit 440 may acquire first image data and second image data to correspond to one subject.

Figure 5A:
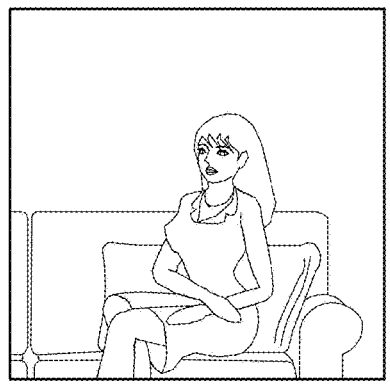
FIGS. 5A, 5B, 6A and 6B are diagrams illustrating example image data according to various example embodiments of the present disclosure.
Figure 5B:
Figure 6A:
Figure 6B:

For example, the first image data and second image data may be asymmetrical to each other, as illustrated in FIGS. 5A and 5B. To this end, the first attribute parameter of the first image data and the second attribute parameter of the second image data may be different from each other. On the other hand, the first image data and second image data may be symmetrical to each other, as illustrated in FIGS. 6A and 6B. In addition, the camera unit 440 may process dual image data. To this end, the first attribute parameter of the first image data may be the same as the second attribute parameter of the second image data.

Figure 7:
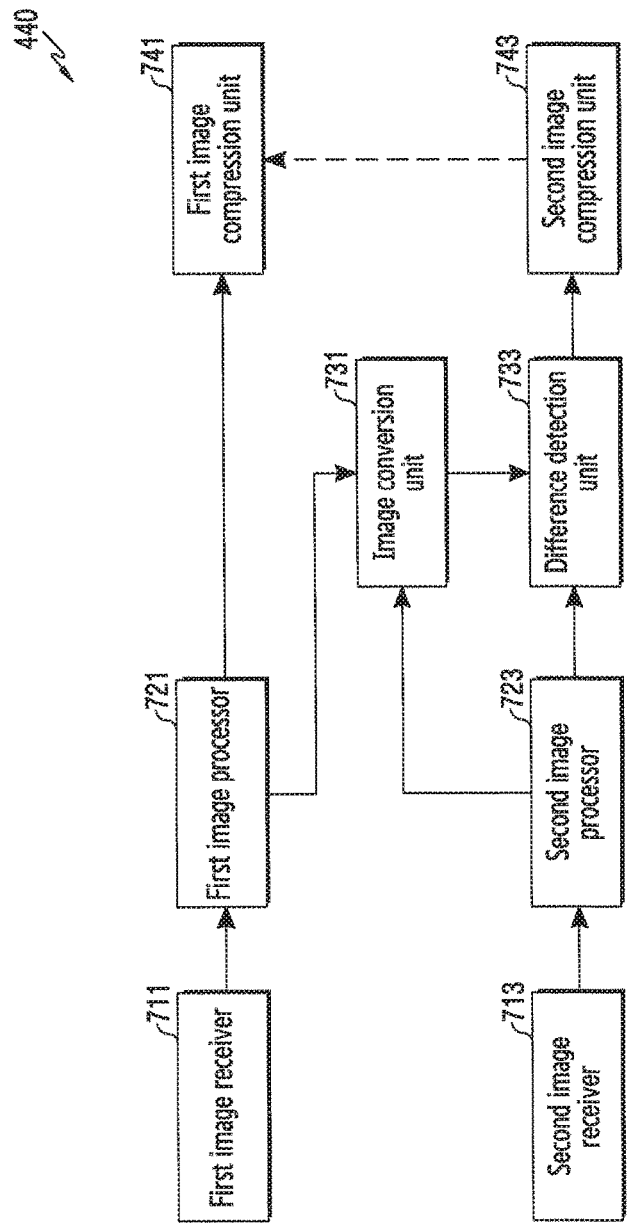
FIG. 7 is a block diagram illustrating an example camera unit of FIG. 4.

FIG. 7 is a block diagram illustrating an example camera unit in FIG. 4.

Referring to FIG. 7, the camera unit 440 according to various embodiments may include a first image receiver (e.g., including first image receiving circuitry) 711, a second image receiver (e.g., including second image receiving circuitry) 713, a first image processor 721, a second image processor 723, an image conversion unit (e.g., including image conversion circuitry) 731, a difference detection unit (e.g. including difference detection circuitry) 733, a first image compression unit (e.g., including first image compression circuitry) 741, and a second image compression unit (e.g., including second image compression circuitry) 743.

The first image receiver 711 and the second image receiver 713 may receive respective image data. To this end, the first image receiver 711 and second image receiver 713 may include various image receiving circuitry, such as, for example, and without limitation, at least one of the at least one lens, a filter, or a sensor. The lens may allow an optical image signal to be incident thereto. The filter may filter the optical image signal. For example, the filter may block an infrared signal from the optical image signal. The sensor may convert the optical image signal into an electric image signal. For example, the sensor may be a Charge Coupled Device (CCD) or Complementary Metal-Oxide Semiconductor (CMOS), or the like, but is not limited thereto.

According to various embodiments, the first image receiver 711 may receive first image data, and the second image receiver 713 may receive second image data. To this end, the first image receiver 711 may be driven according to a predetermined first attribute parameter and the second image receiver 713 may be driven according to a predetermined second attribute parameter. Here, the first image receiver 711 and the second image receiver 713 may be asymmetrical to each other. That is, the first attribute parameter and the second attribute parameter may be different from each other. For example, the angle of view of the first image receiver 711 may correspond to a telephoto image, and the numerical value of a color of the first image receiver 711 may correspond to color (RGB). On the other hand, the angle of view of the second image receiver 713 may correspond to a wide-angle image, and the numerical value of a color of the second image receiver 713 may correspond to black and white (BW).

The first image processor 721 and the second image processor 723 may process respective image data. Here, the first image processor 721 and second image processor 723 may convert an analog image signal into a digital image data. For example, the first image processor 721 and the second image processor 723 may be implemented as an Image Signal Processor (ISP). To this end, the first image processor 721 may be functionally connected to the first image receiver 711 so as to process the first image data. In addition, the second image processor 723 may be functionally connected to the second image receiver 713 so as to process the second image data.

The image conversion unit 731 may include various image conversion circuitry configured to convert the first image data. According to various embodiments, the image conversion unit 731 may include various circuitry configured to convert the first image data based on predetermined reference information. Here, a conversion scheme for the first image data may be determined according to the reference information. That is, the image conversion unit 731 may convert the first image data according to a predetermined conversion scheme. Accordingly, the image conversion unit 731 may generate converted image data from the first image data.

The difference detection unit 733 may include various difference detection circuitry configured to detect difference data between the converted image data and the second image data. To this end, the difference detection unit 733 may include various circuitry to compare the second image data with the converted image data. For example, the difference detection unit 733 may detect the difference data by excluding the converted image data from the second image data. Through which, the difference detection unit 733 may detect the difference data as an edge image data.

For example, the reference information may be determined based on the first attribute parameter and the second attribute parameter. In addition, the reference information may be determined by making reference to one of the first attribute parameter and the second attribute parameter. In addition, the reference information may be determined based on a difference in component between the first attribute parameter and the second attribute parameter. On the other hand, the conversion scheme may include at least one of cropping, scaling, color conversion, disparity compensation, light balance compensation, exposure compensation, or focus compensation.

The first image compression unit 741 may include various circuitry configured to compress the first image data. Here, the first image compression unit 741 may include circuitry to encode the first image data. Accordingly, the first image compression circuitry of the first image compression unit 741 may convert the first image data into compressed image data which has a bit stream structure. Here, the compression circuitry of the first image compression unit 741 may include an image encoder. For example, the image compression circuitry of the first image compression unit 741 may include one of a JPEG encoder or an MPEG4 encoder.

The second image compression unit 743 may include various circuitry configured to compress the difference data. Here, the second image compression unit 743 may include circuitry to encode the difference data. Accordingly, the second image compression unit 743 may include various circuitry to convert the difference data into compressed image data which has a bit stream structure. For example, the image compression circuitry of the second image compression unit 743 may include an edge encoder.

According to an embodiment, the first image compression unit 741 may include circuitry to generate a compressed image file. That is, the image compression circuitry of the first image compression unit 741 may generate the compressed image file using the first image data and difference data. To this end, the image compression circuitry of the first image compression unit 741 may receive the difference data from the second image compression unit 743 so as to generate the compressed image file. Here, the image compression circuitry of the first image compression unit 741 may generate the compressed image file, using the bit stream of the first image data and the bit stream of the difference data.

The memory 450 may store operation programs of the electronic device 400. Here, the memory 450 may store programs for processing dual image data. In addition, the memory 450 may store data generated while programs are being executed. According to an embodiment, the memory 450 may store a compressed image file. According to another embodiment, the memory 450 may store first image data. For example, the memory 450 may also store the identification information for identifying the difference data, in relation to the first image data.

The controller 460 may control an overall operation of the electronic device 400. To this end, the controller 460 may be functionally connected to elements of the electronic device 400 so as to control the elements of the electronic device 400. In addition, the controller 460 may receive a command or data from the elements of the electronic device 400 and process the same. Accordingly, the controller 460 may perform various functions. For example, the controller 460 may include a function processing unit for each function. In addition, the function processing unit may be an application processor (AP). According to various embodiments, the controller 460 may process dual image data.

According to various embodiments, the controller 460 may store the dual image data. According to an embodiment, the controller 460 may store a compressed image file. That is, the controller 460 may receive the compressed image file from the camera unit 440 so as to store the compressed image file in the memory 450. According to another embodiment, the controller 460 may individually store the first image data and the difference data. That is, the controller 460 may receive the first image data from the camera unit 440 so as to store the first image data in the memory 450. In addition, the controller 460 may receive the difference data from the camera unit 440 so as to store the difference data in an external device (not shown). To this end, the controller 460 may transmit, to an external device, image compressed data for the difference data. Here, the controller 460 may also store the identification information for identifying between the first image data and the difference data, in relation to the first image data and difference data.

Figure 8:
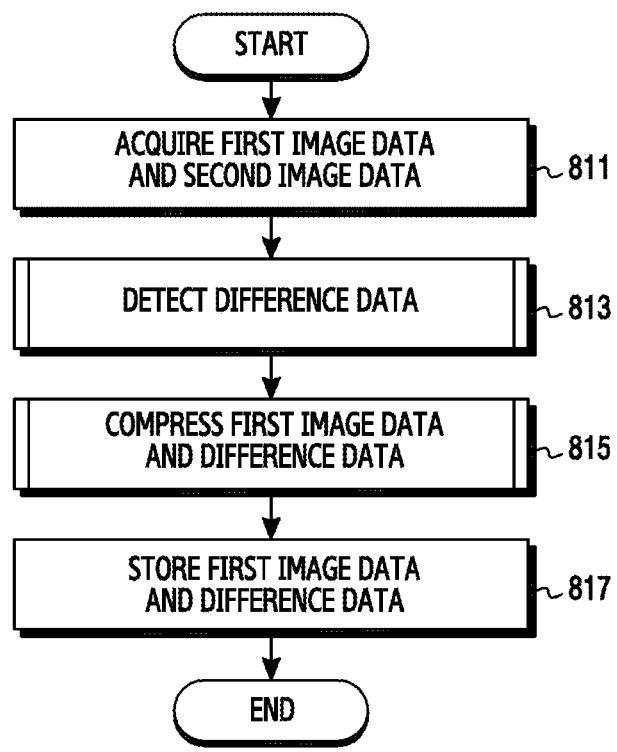
FIG. 8 is a flowchart illustrating an example method of operating an electronic device according to various example embodiments of the present disclosure.

FIG. 8 is a flowchart illustrating an example method of operating an electronic device according to various example embodiments. In addition, FIGS. 13A, 13B FIGS. 14A, 14B, 14C, FIGS. 15A, 15B, 15C and FIGS. 16A, 16B, and 16C are diagrams illustrating an example operation method for an electronic device according to various example embodiments of the present disclosure.

Referring to FIG. 8, the operation method for the electronic device 400 according to various example embodiments may be initiated from acquiring first image data and second image data by the camera unit 440, in operation 811. To this end, the camera unit 440 may be driven according to a predetermined attribute parameter. Accordingly, the attribute parameter of image data may be determined to correspond to the attribute parameter of the camera unit 440. For example, the attribute parameter may include at least one of a viewing angle, a resolution, a numerical value of a color, the position of an object point, white balance, exposure, or a focus length.

According to various embodiments, the first image receiver 711 may receive the first image data, and the second image receiver 713 may receive the second image data. To this end, the first image receiver 711 may be driven according to a predetermined first attribute parameter and the second image receiver 713 may be driven according to a predetermined second attribute parameter. Here, the first image receiver 711 and the second image receiver 713 may be asymmetrical to each other. That is, the first attribute parameter and the second attribute parameter may be different from each other. In addition, the first image processor 721 may process the first image data, and the second image processor 723 may process the second image data.

Figure 13A:
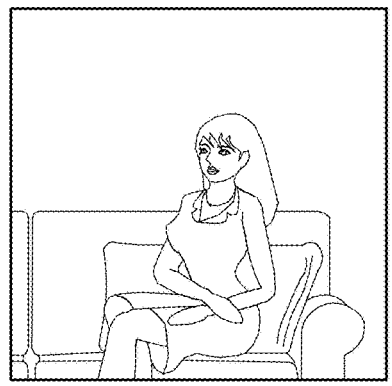
Figure 13B:
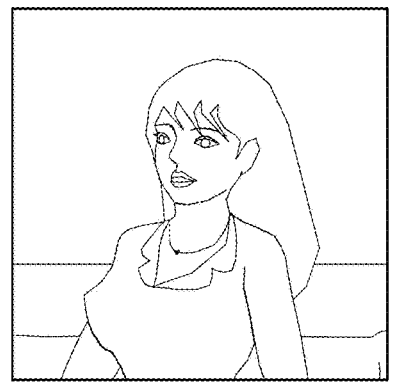

Accordingly, the first image data and second image data may be asymmetrical to each other, as illustrated in FIGS. 13A and 13B. According to an embodiment, as illustrated in FIG. 13A, the angle of view of the first image data may correspond to a telephoto image, and the numerical value of a color of the first image data may correspond to RGB colors. On the other hand, as shown in FIG. 13B, the angle of view of the second image data may correspond to a wide-angle image, and the numerical value of a color of the second image data may correspond to black and white (BW). According to another embodiment, as shown in FIG. 13B, the angle of view of the first image data may correspond to a telephoto image, and the numerical value of a color of the first image data may correspond to black and white (BW). On the other hand, as shown in FIG. 13A, the angle of view of the second image data may correspond to a wide-angle image, and the numerical value of a color of the second image data may correspond to RGB colors.

Then, the camera unit 440 may detect difference data based on the first image data and second image data in operation 813. To this end, the camera unit 440 may convert the first image data so as to generate converted image data from the first image data. In addition, the camera unit 440 may detect difference data between the converted image data and the second image data.

Figure 9:
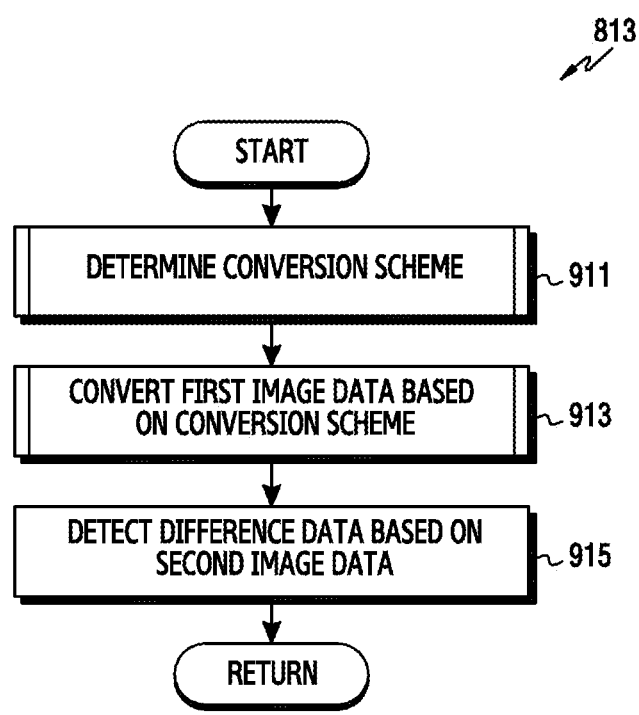
FIG. 9 is a flowchart illustrating an example operation of detecting difference data in FIG. 8.

FIG. 9 is a flowchart illustrating an example difference data detection operation in FIG. 8.

Referring to FIG. 9, the image conversion unit 731 may determine a conversion scheme in operation 911. Here, the conversion scheme may be determined to correspond to reference information. In addition, the reference information may be determined based on a first attribute parameter and a second attribute parameter. Here, the reference information may be determined by making reference to one of the first attribute parameter and the second attribute parameter. For example, the reference information may be determined by making reference to the second attribute parameter. In addition, the reference information may be determined based on a difference in component between the first attribute parameter and the second attribute parameter. For example, the conversion scheme may include at least one of cropping, scaling, color conversion, disparity compensation, light balance compensation, exposure compensation, or focus compensation.

Figure 10:
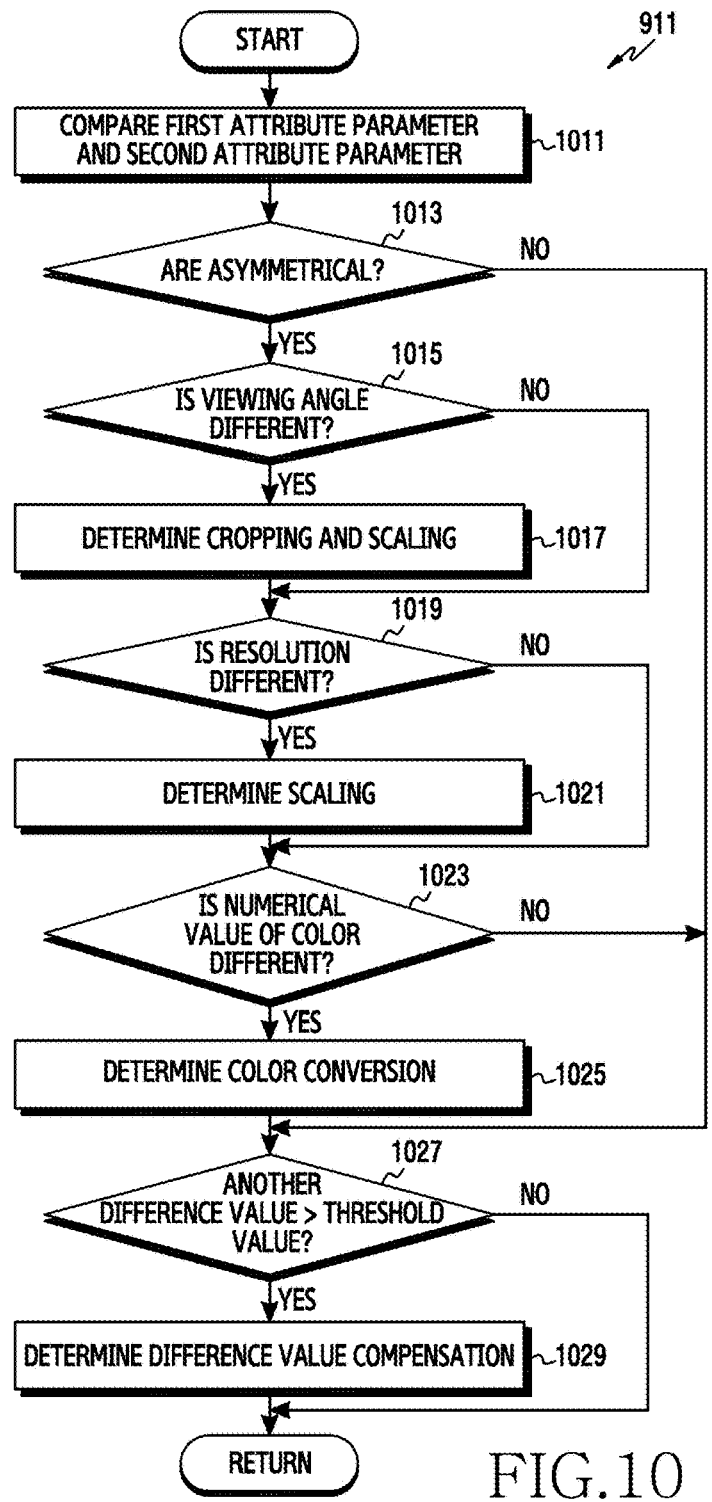
FIG. 10 is a flowchart illustrating an example operation for determining a conversion scheme in FIG. 9.

FIG. 10 is a flowchart illustrating an example operation of determining a conversion scheme in FIG. 9.

Referring to FIG. 10, the image conversion unit 731 may compare a first attribute parameter and a second attribute parameter in operation 1011. In addition, the image conversion unit 731 may determine whether the first attribute parameter and the second attribute parameter are asymmetrical to each other in operation 1013.

Then, in operation 1013, when it is determined that the first attribute parameter and the second attribute parameter are asymmetrical to each other, the image conversion unit 731 may determine whether the angle of view of the first attribute parameter and the angle of view of the second attribute parameter are different from each other in operation 1015. Here, in operation 1013, when it is determined that the angle of view of the first attribute parameter and the angle of view of the second attribute parameter are different from each other, the image conversion unit 731 may determine cropping and scaling operations in operation 1017. Thereafter, the image conversion unit 731 may proceed to operation 1019. On the other hand, in operation 1013, when it is determined that the angle of view of the first attribute parameter is the same as that of the second attribute parameter, the image conversion unit 731 may proceed to operation 1019.

Then, in operation 1019, the image conversion unit 731 may determine whether the resolution of the first attribute parameter and the resolution of the second attribute parameter are different from each other. Here, in operation 1019, when it is determined that the resolution of the first attribute parameter and the resolution of the second attribute parameter are different from each other, the image conversion unit 731 may determine scaling in operation 1021. Thereafter, the image conversion unit 731 may proceed to operation 1023. On the other hand, in operation 1019, when the resolution of the first attribute parameter is determined to be the same as that of the second attribute parameter, the image conversion unit 731 may proceed to operation 1023.

Then, in operation 1023, the image conversion unit 731 may determine whether a numerical value of a color of the first attribute parameter and a numerical value of a color of the second attribute parameter are different from each other. Here, in operation 1023, when it is determined that the color value of the first attribute parameter and the color value of the second attribute parameter are different from each other, the image conversion unit 731 may determine color conversion in operation 1025. Thereafter, the image conversion unit 731 may proceed to operation 1027. On the other hand, in operation 1023, when it is determined that the color value of the first attribute parameter is the same as that of the second attribute parameter, the image conversion unit 731 may proceed to operation 1027.

Then, in operation 1027, the image conversion unit 731 may determine whether another difference value between the first attribute parameter and the second attribute parameter exceeds a predetermined threshold value. Here, in operation 1027, when it is determined that another difference value between the first attribute parameter and the second attribute parameter exceeds the threshold value, the image conversion unit 731 may determine difference value compensation in operation 1029. Thereafter, the image conversion unit 731 may return to FIG. 9. On the other hand, in operation 1027, when it is determined that another difference value between the first attribute parameter and the second attribute parameter is lower than or equal to the threshold value, the image conversion unit 731 may return to FIG. 9.

On the other hand, in operation 1013, when it is determined that the first attribute parameter and the second attribute parameter are asymmetrical to each other, the image conversion unit 731 may determine whether another difference value between the first attribute parameter and the second attribute parameter exceeds a predetermined threshold value. Here, in operation 1027, when it is determined that another difference value between the first attribute parameter and the second attribute parameter exceeds the threshold value, the image conversion unit 731 may determine difference value compensation in operation 1029. Thereafter, the image conversion unit 731 may return to FIG. 9. On the other hand, in operation 1027, when it is determined that another difference value between the first attribute parameter and the second attribute parameter is lower than or equal to the threshold value, the image conversion unit 731 may return to FIG. 9.

For example, another difference value of the first attribute parameter and the second attribute parameter may be calculated by equation (1) as follows. That is, another difference value may be calculated using a combination of the disparity, white balance difference value, exposure difference value, and focus difference value between the first attribute parameter and second attribute parameter. Here, the disparity may be calculated from a distance between the position of an object point in the first attribute parameter and the position of an object point in the second attribute parameter.

[Equation 1]

$$\text{Another difference value} = a \cdot \text{disparity} + b \cdot \text{white balance difference value} + c \cdot \text{exposure difference value} + d \cdot \text{focus difference value} \quad (1)$$

Here, a, b, c and d may represent weight values.

Then, the image conversion unit 731 may convert the first image data based on the conversion scheme in operation 913. Here, the image conversion unit 731 may perform at least one of operations of cropping, scaling, color conversion, disparity compensation, light balance compensation, exposure compensation, or focus compensation. For example, the image conversion unit 731 may perform a cropping operation so as to trim a partial region from the first image data. Alternatively, the image conversion unit 731 may perform a scaling operation so as to change the size of at least partial region of the first image data. Alternatively, the image conversion unit 731 may perform a color conversion so as to detect YCbCr from RGB. Accordingly, the image conversion unit 731 may generate converted image data from the first image data.

Figure 11:
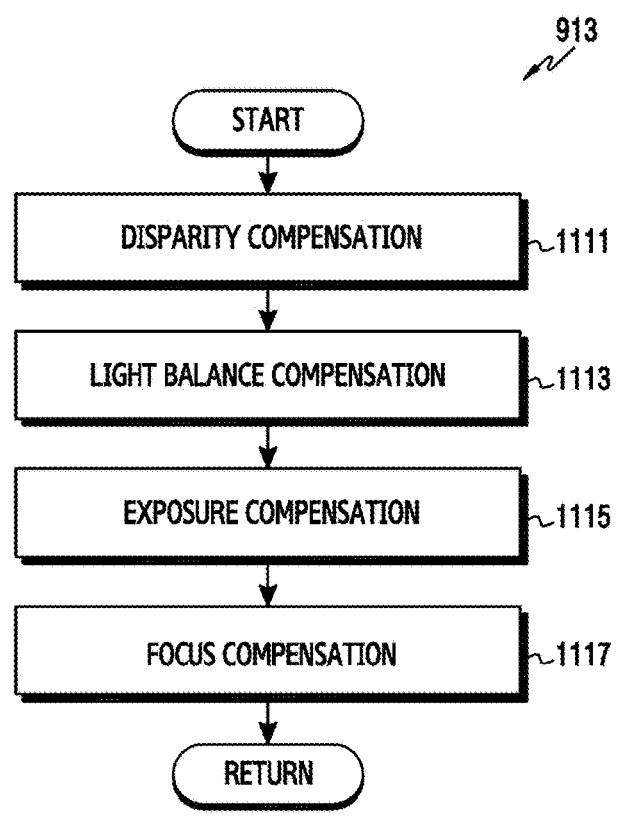
FIG. 11 is a flowchart illustrating an example conversion operation of first image data based on a conversion scheme in FIG. 9.

FIG. 11 is a flowchart illustrating an example conversion operation of first image data based on a conversion scheme in FIG. 9.

Referring to FIG. 11, the image conversion unit 731 may apply the disparity compensation to the first image data in operation 1111. In addition, the image conversion unit 731 may apply the light balance compensation to the first image data in operation 1113. In addition, the image conversion unit 731 may apply the exposure compensation to the first image data in operation 1115. In addition, the image conversion unit 731 may apply the focus compensation to the first image data in operation 1117. Accordingly, the image conversion unit 731 may generate the converted image data. Thereafter, the image conversion unit 731 may return to FIG. 9.

Then, the difference detection unit 733 may detect difference data based on the second image data in operation 915. That is, the difference detection unit 733 may detect difference data between the converted image data and the second image data. To this end, the difference conversion unit 731 may compare the second image data with the converted image data. For example, the difference detection unit 733 may detect difference data by excluding the converted image data from the second image data. Accordingly, the difference detection unit 733 may detect the difference data as an edge image data.

Figures 14A, 14B:
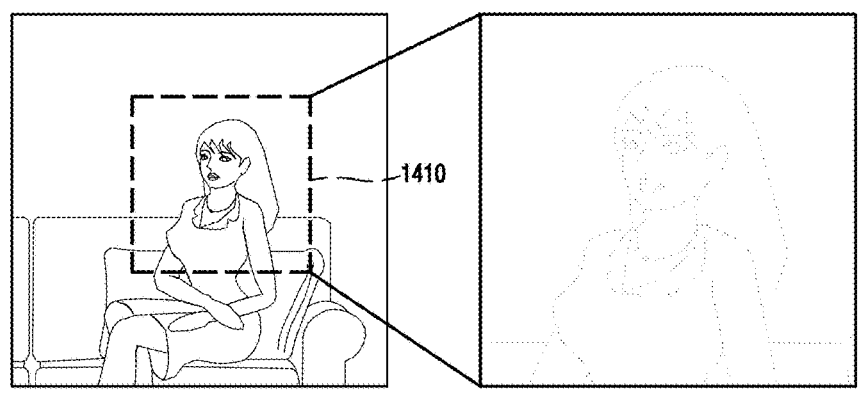
Figure 14C:

According to an embodiment, as illustrated in FIG. 13A, the angle of view of the first image data may correspond to a telephoto image, and the numerical value of a color of the first image data may correspond to RGB colors. On the other hand, as illustrated in FIG. 13B, the angle of view of the second image data may correspond to a wide-angle image, and the numerical value of a color of the second image data may correspond to black and white (BW). In this case, the image conversion unit 731 may perform cropping on a matching region 1410 in the first image data, as illustrated in FIG. 14A. In addition, the image conversion unit 731 may perform scaling on the matching region 1410 as illustrated in FIG. 14B so as to generate converted image data. At this time, the image conversion unit 731 may upscale the size of the matching region 410 so as to be equal to the size of the second image data. In addition, as illustrated in FIG. 14C, the difference detection unit 733 may detect the difference data by excluding the converted image data from the second image data.

Figures 15A, 15B:
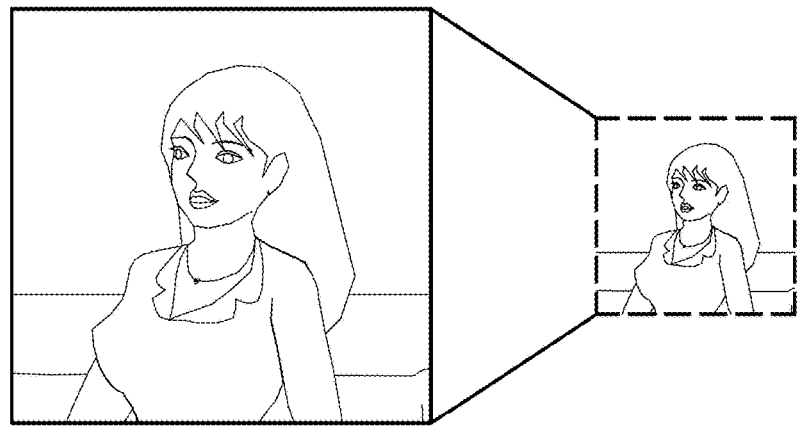
Figure 15C:
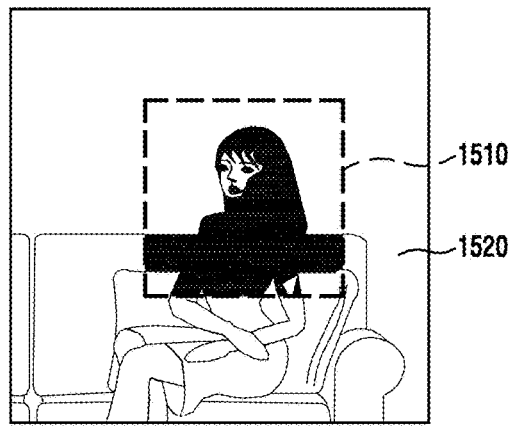

According to another embodiment, as illustrated in FIG. 13B, the angle of view of the first image data may correspond to a wide-angle image, and the numerical value of a color of the first image data may correspond to black and white (BW). On the other hand, as illustrated in FIG. 13A, the angle of view of the second image data may correspond to a telephoto image, and the numerical value of a color of the second image data may correspond to RGB colors. In this case, the image conversion unit 731 may perform scaling on the first image data, as illustrated in FIGS. 15A and 15B, so as to generate converted image data. At this time, the image conversion unit 731 may down-scale the size of the first image data so as to be equal to the size of a matching region 1510 of the second image data. In addition, as illustrated in FIG. 15C, the difference detection unit 733 may detect the difference data by subtracting the converted image data from the second image data. Here, the difference detection unit 733 may detect, along with the difference data, residual data in a remaining region 1520 other than the matching region on the second image data.

Subsequently, the camera unit 440 may compress the first image data and the difference data in operation 815. Here, the camera unit 440 may individually compress the first image data and the difference data. According to an embodiment, the camera unit 440 may generate a compressed image file using the first image data and difference data.

Figure 12:
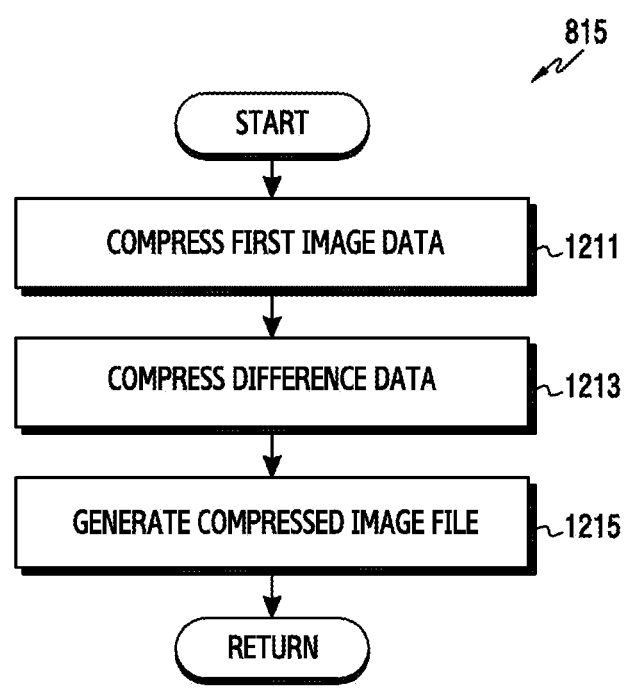
FIG. 12 is a flowchart illustrating an example compression operation for first image data and difference data in FIG. 8.

FIG. 12 is a flowchart illustrating an example compression operation for the first image data and difference data in FIG. 8.

Referring to FIG. 12, the first image compression unit 741 may compress the first image data in operation 1211. Here, the first image compression unit 741 may encode the first image data. Accordingly, the first image compression unit 741 may convert the first image data into compressed image data which has a bit stream structure.

Then, the second image compression unit 743 may compress the difference data in operation 1213. Here, the second image compression unit 743 may encode the difference data. Accordingly, the second image compression unit 743 may convert the difference data into compressed image data which has a bit stream structure. For example, the second image compression unit 743 may include an edge encoder. In addition, the second image compression unit 743 may provide a bit stream of the difference data to the first image compression unit 741.

According to another embodiment, the second image compression unit 743 may further compress residual data of the second image data. Here, the second image compression unit 743 may encode the residual data. Accordingly, the second image compression unit 743 may convert the residual data into a bit stream structure. For example, the second image compression unit 743 may include not only an edge encoder but also an image encoder. In this case, the second image compression unit 743 may provide, to the first image compression unit 741, a bit stream of the residual data along with the bit stream of the difference data.

Then, the first image compression unit 741 may generate a compressed image file in operation 1215. That is, the first image compression unit 741 may generate a compressed image file using the first image data and the difference data. For example, when the bit stream of the difference data is received from the second image compression unit 743, the first image compression unit 741 may generate a compressed image file using the bit stream of the difference data and the bit stream of the first image data.

According to another embodiment, when the bit stream of the difference data and the bit stream of the residual data are received from the second image compression unit 743, the first image compression unit 741 may generate the compressed image file using the bit stream of the difference data, the bit stream of the residual data, and the bit stream of the first image data. Thereafter, the image compression unit 741 may return to FIG. 8.

Figure 16A:

For example, as illustrated in FIG. 16A, a compressed image file 1601 may include a header region 1610 and a payload region 1620. The first image compression unit 741 may insert the bit stream of difference data into the header region 1610, and insert bit stream of the first image data into the payload region 1620. Here, the header region 1610 may include a reference region 1611 and a differential region 1613, and the first image compression unit 741 may insert reference information or a conversion scheme corresponding to the reference information into the reference region 1611, and may insert the bit stream of the difference data into the differential region 1613. Here, the first image compression unit 741 may insert a bit stream of residual data, along with the bit stream of the difference data, into the differential area 1613.

Figure 16B:
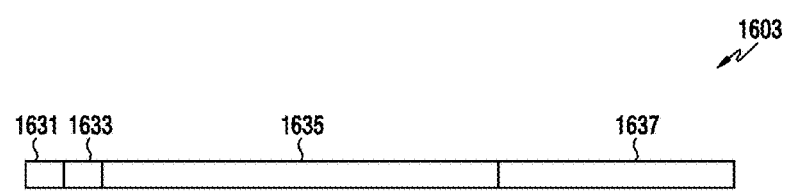

Alternatively, the compressed image file 1603 may have a packet structure as illustrated in FIG. 16B. For example, the compressed image file 1603 may have a packet structure which is transferred to a network abstraction layer (NAL). The compressed image file 1603 may include a plurality of packet regions 1631, 1633, 1635, and 1637, for example, a first packet region 1631, a second packet region 1633, a third packet region 1635, and a fourth packet region 1637. The first image compression unit 741 may insert attribute information for the bit stream of first image data into the first packet region 1631, insert frame basis attribute information for the first image data into the second packet region 1633, and insert the bit stream of the first image data into the third packet region 1635. In addition, the first image compression unit 741 may insert the bit stream of the difference data into the fourth packet region 1637. For example, the fourth packet region 1637 may include a pay load structure as illustrated in FIG. 16C. Here, the first image compression unit 741 may insert, into the fourth packet region 1637, reference information or a conversion scheme corresponding to reference information along with the bit stream of the difference data. On the other hand, the first image compression unit 741 may insert, into the fourth packet region 1637, the bit stream of residual data along with the bit stream of the difference data.

Finally, the camera unit 440 may store the first image data and difference data in operation 817. According to an embodiment, the controller 460 may receive the compressed image file from the camera unit 440 so as to store the compressed image file in the memory 450. According to another embodiment, the controller 460 may individually store the first image data and difference data. That is, the controller 460 may receive the first image data from the camera unit 440 so as to store the first image data in the memory 450. In addition, the controller 460 may receive compressed image data of the difference data from the camera unit 440 so as to store the compressed image data of the difference data in an external device (not shown). To this end, the controller 460 may transmit, to the external device, compressed image data for the difference data. Here, the controller 460 may also store identification information for identifying between the first image data and the difference data, in relation to the first image data and difference data. Accordingly, an operation method for the electronic device 400 may be terminated.

According to various embodiments, the controller 460 may generate screen data based on dual image data. That is, the controller 460 may generate screen data using the first image data and second image data. To this end, the controller 460 may acquire the first image data and difference data. According to an embodiment, the controller 460 may acquire the difference data and first image data from the compressed image file. To this end, the controller 460 may determine a compressed image file from the memory 450, and receive the compressed image file through the communication unit 410. According to another embodiment, the memory 460 may individually acquire the difference data and the first image data. To this end, the controller 460 may determine the first image data from the memory 450, and receive the difference data from the external device. Alternatively, the controller 460 may individually receive the difference data and the first image data from other external devices different from each other.

According to various embodiments, the controller 460 may recover the difference data and first image data. According to an embodiment, the controller 460 may recover the difference data and first image data from the compressed image file. According to another embodiment, the memory 460 may recover the difference data and the first image data, respectively. Here, the controller 460 may decode the bit stream of the difference data and the bit stream of the first image data. In addition, the controller 460 may detect second image data based on the difference data and first image data. In addition, the controller 460 may synthesize the first image data and the second image data.

According to various embodiments, the controller 460 may share dual image data with an external device. According to an embodiment, the controller 460 may transmit a compressed image file to the external device. At this time, the controller 460 may transmit the compressed image file as it is. Alternatively, the controller 460 may process the difference data from the compressed image file so as to transmit the same. For example, the controller 460 may remove the difference data from the compressed image file. Alternatively, the controller 460 may recover the difference data from the compressed image file and generate another file using the difference data. In addition, the controller 460 may transmit the compressed image file and other file. According to another embodiment, the controller 460 may transmit the first image data to an external device. Here, the controller 460 may transmit identification information for identifying the difference data to correspond to the first image data.

Figure 17:
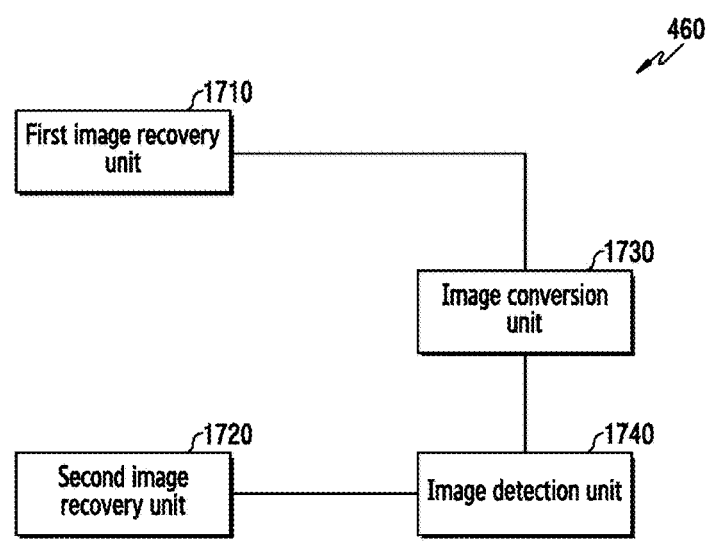
FIG. 17 is a block diagram illustrating an example controller in FIG. 4.

FIG. 17 is a block diagram illustrating an example controller in FIG. 4.

Referring to FIG. 17, the controller 460 may include a first image recovery unit (e.g., including first image recovery circuitry) 1710, a second image recovery unit (e.g., including second image recover circuitry) 1720, an image conversion unit (e.g., including image conversion circuitry) 1730, and an image detection unit (e.g., including image detection circuitry) 1740.

The first image recovery unit 1710 may include various circuitry configured to recover the first image data. Here, the image recovery circuitry of the first image recovery unit 1710 may decode a bit stream of the first image data. Here, the first image recovery circuitry of the first image recovery unit 1710 may include an image decoder. For example, the first image recovery circuitry of the first image recovery unit 1710 may include one of a JPEG decoder or an MPEG4 decoder.

The second image recovery unit 1720 may include various circuitry configured to recover the difference data. Here, the image recovery circuitry of the second image recovery unit 1720 may decode the bit stream of the difference data. For example, the second image recover circuitry of the second image recovery unit 1720 may include an edge encoder.

The image conversion unit 1730 may include various circuitry configured to convert the first image data. According to various embodiments, the image conversion circuitry of the image conversion unit 1730 may convert the first image data based on predetermined reference information. Here, a conversion scheme for the first image data may be determined according to the reference information. That is, the image conversion unit 1730 may convert the first image data according to a predetermined conversion scheme.

Accordingly, the image conversion unit 1730 may generate converted image data from the first image data.

The image detection unit 1740 may include various circuitry configured to detect second image data. That is, the image detection circuitry of the image detection unit 1740 may detect the second image data based on the converted image data and difference data. For example, the image detection unit 1740 may add the difference data to the converted image data so as to detect the second image data.

Figure 18:
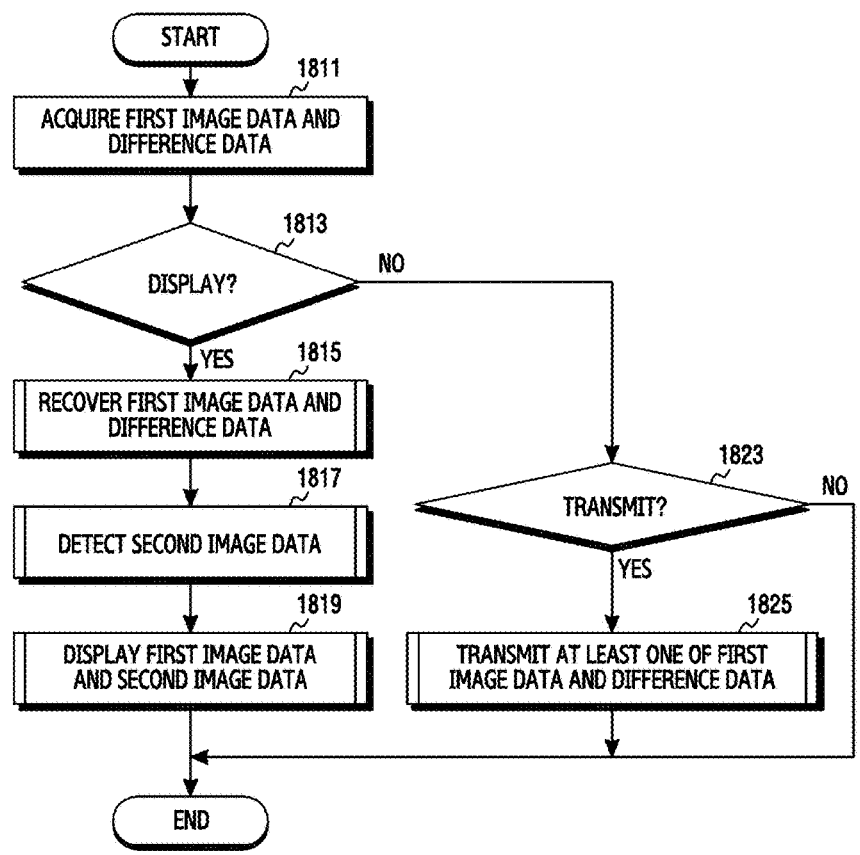
FIG. 18 is a flowchart illustrating an example method of operation of an electronic device according to various example embodiments of the present disclosure.

FIG. 18 is a flowchart illustrating an example method of operation for an electronic device according to various example embodiments. In addition, FIGS. 24A, 24B, 24C, FIGS. 25A, 25B, 25C, 25D, FIGS. 26A, 26B, 26C, and FIGS. 27A, 27B and 27C are diagrams illustrating an example method of operation for an electronic device according to various example embodiments of the present disclosure.

Referring to FIG. 18, the operation method for the electronic device 400 according to various embodiments may be initiated from acquiring the first image data and difference data by the controller 460, in operation 1811. According to an embodiment, the controller 460 may acquire the difference data and first image data from the compressed image file. To this end, the controller 460 may determine a compressed image file from the memory 450, and receive the compressed image file through the communication unit 410. According to another embodiment, the controller 460 may individually acquire the difference data and the first image data. To this end, the controller 460 may determine the first image data from the memory 450, and receive the difference data from the external device. Alternatively, the controller 460 may individually receive the difference data and the first image data from other external devices different from each other.

Then, when a request for displaying the first image data and second image data occurs, the controller 460 may sense the request in operation 1813. In addition, when a request for displaying the first image data and second image data is sensed in operation 1813, the controller 460 may recover the first image data and difference data in operation 1815. Here, the controller 460 may recover the first image data and difference data from the compressed image file. Here, the controller 460 may decode the bit stream of the first image data and the bit stream of the difference data.

According to various embodiments, the first image recovery unit 1710 may recover the first image data. Here, the first image recovery unit 1710 may decode a bit stream of the first image data. In addition, the second image recovery unit 1720 may recover the difference data. Here, the second image recovery unit 1720 may decode the bit stream of the difference data. For example, the second image recovery unit 1720 may include an edge encoder. In addition, the second image recovery unit 1720 may recover reference information or a conversion scheme corresponding to the reference information.

According to another embodiment, the second image recovery unit 1720 may further recover residual data. Here, the second image recovery unit 1720 may decode a bit stream of the residual data. For example, the second image recovery unit 1720 may further include not only an edge decoder but also an image decoder.

Subsequently, the controller 460 may detect the second image data in operation 1817. Here, the controller 460 may detect the second image data based on the first image data and difference data. To this end, the controller 460 may convert the first image data so as to generate converted image data from the first image data. In addition, the controller 460 may add the difference data to the converted image data so as to detect the second image data.

Figure 19:
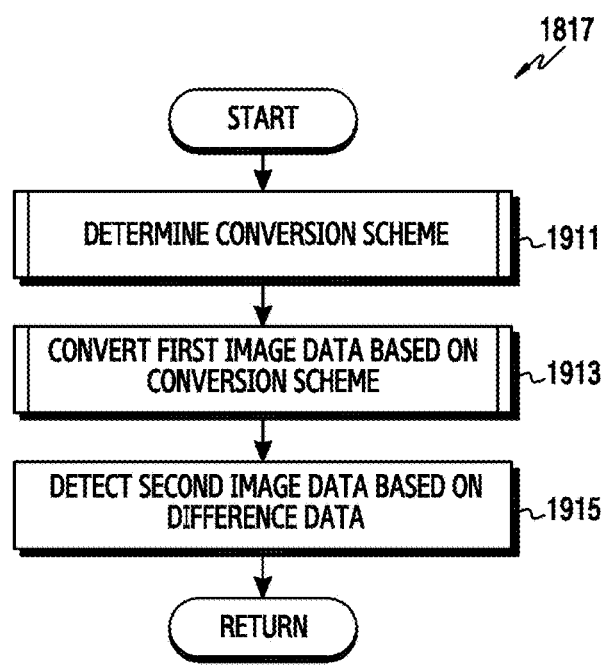
FIG. 19 is a flowchart illustrating an example operation of detecting second image data in FIG. 18.

FIG. 19 is a flowchart illustrating an example operation of detecting second image data in FIG. 18.

Referring to FIG. 19, the image conversion unit 1730 may determine a conversion scheme in operation 1911. Here, the conversion scheme may be determined to correspond to the reference information. In addition, the reference information may be determined based on a first attribute parameter and a second attribute parameter. Here, the reference information may be determined by making reference to one of the first attribute parameter and second attribute parameter. For example, the reference information may be determined by making reference to the second attribute parameter. In addition, the reference information may be determined based on a difference in component between the first attribute parameter and the second attribute parameter. For example, the conversion scheme may include at least one of cropping, scaling, color conversion, disparity compensation, light balance compensation, exposure compensation, or focus compensation.

Figure 20:
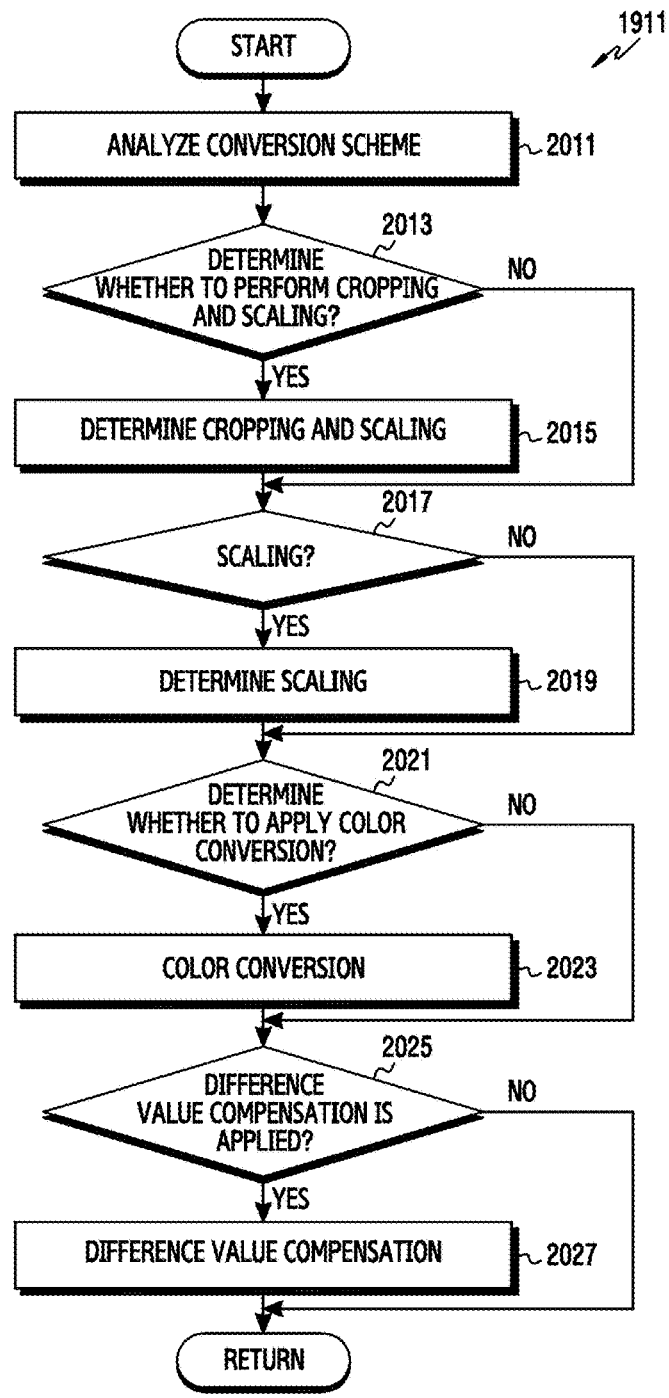
FIG. 20 is a flowchart illustrating an example operation of determining a conversion scheme in FIG. 19.

FIG. 20 is a flowchart illustrating an example operation of determining a conversion scheme in FIG. 19.

Referring to FIG. 20, the image conversion unit 1730 may analyze a conversion scheme in operation 2011. At this time, the image conversion unit 1730 may analyze the conversion scheme based on reference information. Here, the image conversion unit 1730 may compare the first attribute parameter and the second attribute parameter.

Then, the image conversion unit 1730 may determine whether to apply cropping and scaling operations. Here, the image conversion unit 1730 may determine whether the angle of view of the first attribute parameter and the angle of view of the second attribute parameter are different from each other. In addition, in operation 2013, when it is determined that the cropping and scaling are applied, the image conversion unit 1730 may determine the cropping and scaling in operation 2015. That is, when it is determined that the angle of view of the first attribute parameter and the angle of view of the second attribute parameter are different from each other, the image conversion unit 1730 may determine cropping and scaling operations. Thereafter, the image conversion unit 1730 may proceed to operation 2017. On the other hand, in operation 2013, when it is determined that the cropping and scaling are not applied, the image conversion unit 1730 may proceed to operation 2017. That is, when it is determined that the angle of view of the first attribute parameter is the same as that of the second attribute parameter, the image conversion unit 1730 may proceed to operation 2017.

Then, the image conversion unit 1730 may determine whether to apply a scaling operation. Here, the image conversion unit 1730 may determine whether the resolution of the first attribute parameter and the resolution of the second attribute parameter are different from each other. In addition, in operation 2017, when it is determined that the scaling is applied, the image conversion unit 1730 may determine the scaling in operation 2019. That is, when it is determined that the resolution of the first attribute parameter and the resolution of the second attribute parameter are different from each other, the image conversion unit 1730 may determine the scaling. Thereafter, the image conversion unit 1730 may proceed to operation 2021. On the other hand, in operation 2017, when it is determined that the scaling is not applied, the image conversion unit 1730 may proceed to operation 2021. That is, when it is determined that the resolution of the first attribute parameter is the same as that of the second attribute parameter, the image conversion unit 1730 may proceed to operation 2021.

Then, the image conversion unit 1730 may determine whether to apply color conversion in operation 2021. Here, the image conversion unit 1730 may determine whether a color numerical value of the first attribute parameter and a color numerical value of the second attribute parameter are different from each other. In addition, in operation 2021, when it is determined that the color conversion is applied, the image conversion unit 1730 may determine the color conversion in operation 2023. That is, when it is determined that the color numerical value of the first attribute parameter and the color numerical value of the second attribute parameter are different from each other, the image conversion unit 1730 may determine the color conversion. Thereafter, the image conversion unit 1730 may proceed to operation 2025. On the other hand, in operation 2012, when it is determined that the color conversion is not applied, the image conversion unit 1730 may proceed to operation 2025. That is, when it is determined that the color numerical value of the first attribute parameter is the same as that of the second attribute parameter, the image conversion unit 1730 may proceed to operation 2025.

Then, the image conversion unit 1730 may determine whether to apply difference value compensation. At this time, the image conversion unit 1730 may determine whether another difference value between the first attribute parameter and the second attribute parameter exceeds a predetermined threshold value. In addition, in operation 2025, when it is determined that the difference value compensation is applied, the image conversion unit 1730 may determine the difference value compensation in operation 2027. That is, when it is determined that another difference value between the first attribute parameter and the second attribute parameter exceeds the threshold value, the image conversion unit 1730 may determine the difference value compensation. Thereafter, the image conversion unit 1730 may return to FIG. 19. On the other hand, in operation 2025, when it is determined that the difference value determination is not applied, the image conversion unit 1730 may return to FIG. 19. That is, when it is determined that another difference value between the first attribute parameter and the second attribute parameter is lower than or equal to the threshold value, the image conversion unit 1730 may return to FIG. 19.

For example, another difference value between the first attribute parameter and the second attribute parameter may be determined by equation (2) as follows. That is, another difference value may be determined using a combination of the disparity, white balance difference value, exposure difference value, and focus difference value between the first attribute parameter and second attribute parameter. Here, the disparity may be calculated from a distance between the position of an object point in the first attribute parameter and the position of an object point in the second attribute parameter.

[Equation 2]

$$\text{Another difference value} = a \cdot \text{disparity} + b \cdot \text{white balance difference value} + c \cdot \text{exposure difference value} + d \cdot \text{focus difference value} \quad (2)$$

Here, a, b, c and d may represent weight values.

Then, the image conversion unit 1730 may convert the first image data based on the conversion scheme in operation 1913. That is, the image conversion unit 1730 may convert the first image data according to a predetermined conversion scheme. Here, the image conversion unit 1730 may perform at least one of operations of cropping, scaling, color conversion, disparity compensation, light balance compensation, exposure compensation, or focus compensation. For example, the image conversion unit 1730 may perform a cropping operation so as to trim a partial region from the first image data. Alternatively, the image conversion unit 1730 may perform a scaling operation so as to change the size of at least partial region of the first image data. Alternatively, the image conversion unit 1730 may perform a color conversion so as to detect YCbCr from RGB. Accordingly, the image conversion unit 1730 may generate converted image data from the first image data.

Figure 21:
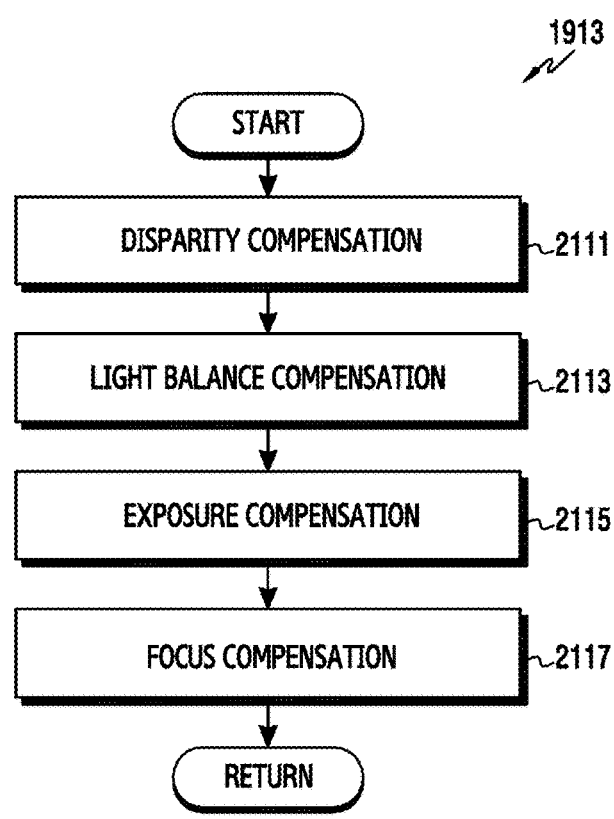
FIG. 21 is a flowchart illustrating an example conversion operation of first image data based on a conversion scheme in FIG. 19.

FIG. 21 is a flowchart illustrating an example conversion operation for first image data based on a conversion scheme in FIG. 19.

Referring to FIG. 21, the image conversion unit 1730 may apply the disparity compensation to the first image data in operation 2111. In addition, the image conversion unit 1730 may apply the light balance compensation to the first image data in operation 2113. In addition, the image conversion unit 1730 may apply the exposure compensation to the first image data in operation 2115. In addition, the image conversion unit 1730 may apply the focus compensation to the first image data in operation 2117. Accordingly, the image conversion unit 1730 may generate the converted image data. Thereafter, the image conversion unit 1730 may return to FIG. 19.

Then, the difference detection unit 1740 may detect difference data based on the difference data in operation 1915. That is, the image detection unit 1740 may detect second image data based on the converted image data and difference data. For example, the image detection unit 1740 may add the difference data to the converted image data so as to detect the second image data. Thereafter, the controller 460 may return to FIG. 18.

Finally, the controller 460 may display the first image data and second image data in operation 1819. At this time, the controller 460 may display at least one of the first image data and second image data. In addition, the controller 460 may synthesize the first image data and the second image data so as to display the same. Accordingly, the operation of the electronic device 400 may be terminated.

For example, the controller 460 may display first image data 2410 on a screen 2400 as shown in FIG. 24A. Alternatively, the controller 460 may display, on the screen 2400, the first image data 2410 in parallel with second image data 2420, as shown in FIG. 24B. Alternatively, the controller 460 may display, on the screen 2400, the first image data 2410 overlapping with the second image data 2420, as shown in FIG. 24C. That is, the controller 460 may display the first image data 2410 on the second image data 2420.

Figure 22:
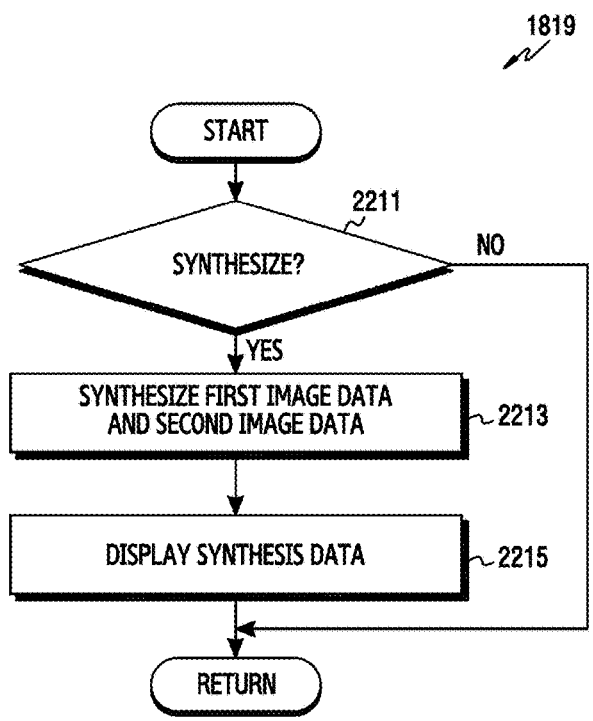
FIG. 22 is a flowchart illustrating an example operation of displaying first image data and second image data in FIG. 18.

FIG. 22 is a flowchart illustrating an example operation of displaying the first image data and second image data in FIG. 18.

Referring to FIG. 22, the controller 460 may determine whether to synthesize the first image data and the second image data in operation 2211. At this time, the controller 460 may determine whether to synthesize the first image data and second image data, in response to a user's request. In addition, in operation 2211, when it is determined that the first image data and second image data are to be synthesized, the controller 460 may synthesize the first image data and second image data in operation 2213. Accordingly, the controller 460 may generate synthesis data of the first image data and second image data. In addition, the controller 460 may display the synthesis data in operation 2215. Thereafter, the controller 460 may return to FIG. 18.

According to an embodiment, when the angle of view of the first image data 2510 is a wide-angle image and the angle of view of the second image data 2520 is a telephoto image, the controller 460 may perform a zoom in and out function on one of the first image data 2510 and the second image data 2520 according to the user's request, as illustrated in FIGS. 25A-25D. Accordingly, the controller 460 may enlarge one of the first image data 2510 and the second image data 2520 so as to generate enlarged data 2530. Here, the controller 460 may trim a peripheral region of one of the first image data 2510 and the second image data 2520. In addition, the controller 460 may perform the zoom function again on the enlarged data 2530 according to the user's request. Here, the controller 460 may reduce the enlarged data 2530 into the central region, and couple at least a portion of the peripheral region of one of the first image data 2510 and second image data 2520 to an outer side of the central region so as to generate synthesis data 2540.

Figure 26A:
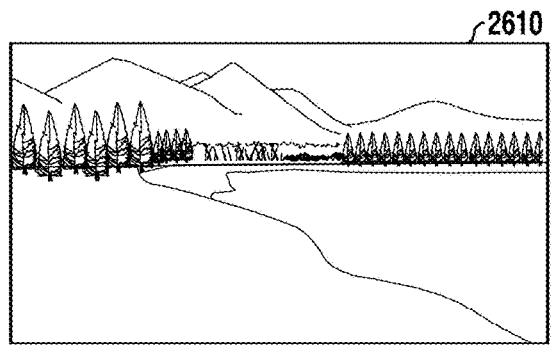
Figure 26B:
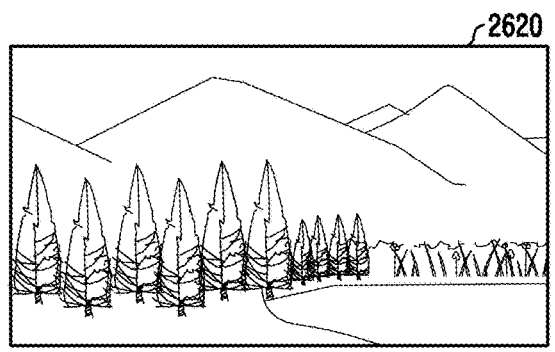
Figure 26C:
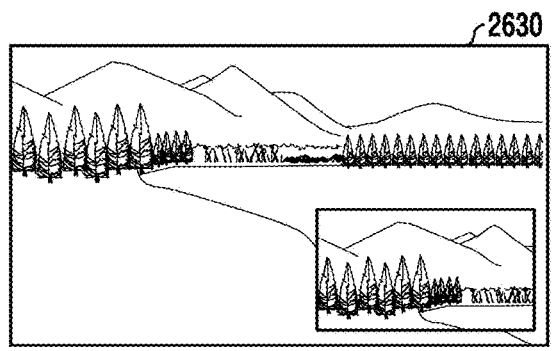
Figure 27C:
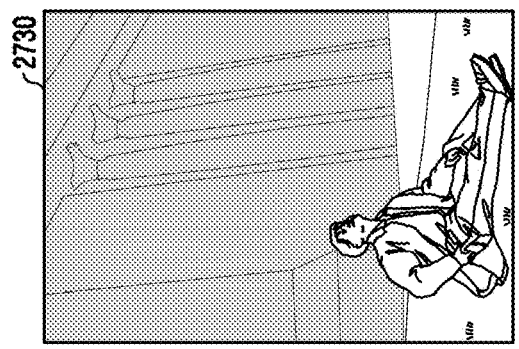
Figure 27B:
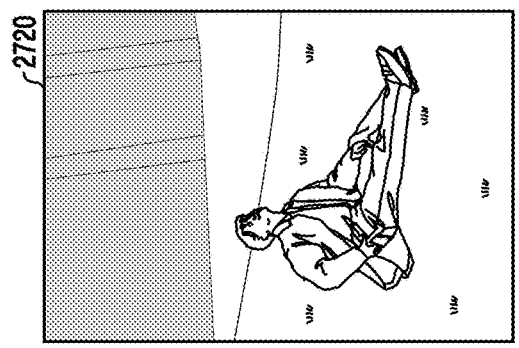
Figure 27A:
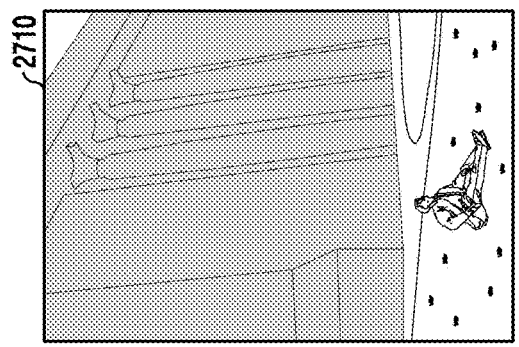

According to another embodiment, when the angle of view of the first image data 2610 is a telephoto image and the angle of view of the second image data 2620 is a wide-angle image, the controller 460 may display synthesis data 2630 of the first image data 2610 and the second image data 2620, as illustrated in FIGS. 26A-26C. At this time, the controller 460 may display the second image data 2620 on a partial region of the first image data 2610. To this end, the controller 460 may reduce the second image data 2620.

According to another embodiment, when the angle of view of the first image data 2710 is a telephoto image and the angle of view of the second image data 2720 is a wide-angle image, the controller 460 may display synthesis data 2730 of the first image data 2710 and the second image data 2720, as shown in FIG. 27. At this time, the controller 460 may couple background data of the first image data and object data of the second image data 2720 so as to display the same. That is, the controller 460 may display the object data of the second image data 2720 on the background data of the first image data 2710.

On the other hand, when a request for transmitting at least one of the first image data and the difference data occurs, the controller 460 may sense the request in operation 1823. In other words, in operation 1813, in a state where a request for displaying the image data 1310 and 1320 is not sensed, the controller 460 may sense the request for transmitting at least one of the first image data and the difference data. In addition, in operation 1823, when the request for transmitting at least one of the first image data and the difference data is sensed, the controller 460 may transmit at least one of the first image data and the difference data to an external device in operation 1825. According to an embodiment, the controller 460 may transmit a compressed image file to the external device. Accordingly, an operation method for the electronic device 400 may be terminated.

Figure 23:
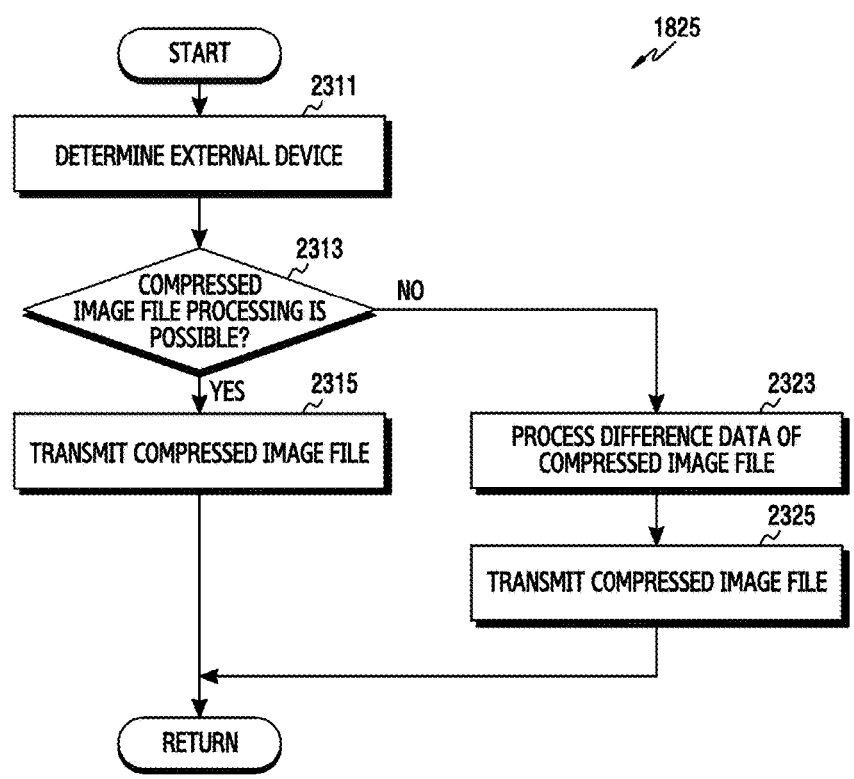
FIG. 23 is a flowchart illustrating an example transmission operation for at least one of first image data and difference data in FIG. 18.
Figure 25D:
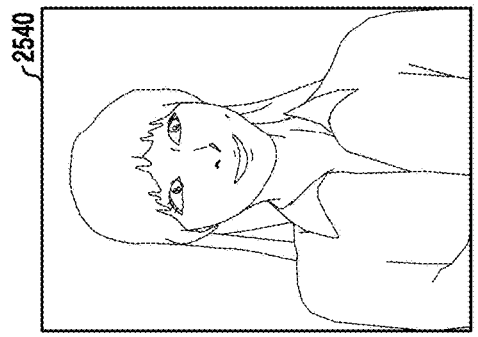
Figure 25C:
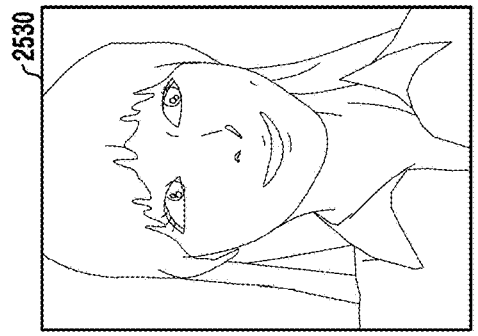
Figure 25B:
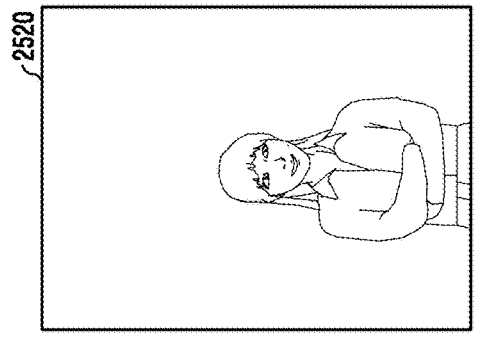
Figure 25A:
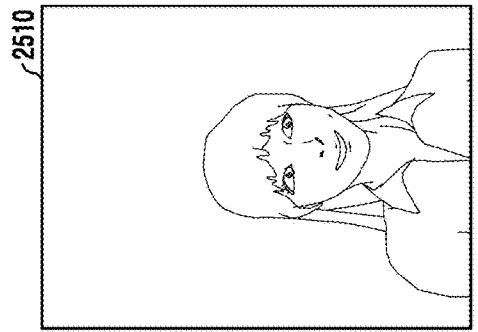

FIG. 23 is a flowchart illustrating an example transmission operation for at least one of the first image data and difference data in FIG. 18.

Referring to FIG. 23, the controller 460 may determine an external device in operation 2311. At this time, the identification information of the external device may be stored in the memory 450. Then, in operation 2313, in relation to the external device, the controller 460 may determine whether processing of the compressed image file is possible. At this time, whether the processing of the compressed image file of the external device is possible may be previously set to correspond to the identification information of the external device.

Then, in operation 2313, in relation to the external device, when it is determined that processing of the compressed image files is possible, the controller 460 may transmit the compressed image file to the external device in operation 2315. That is, the controller 460 may transmit the compressed image file as it is. Thereafter, the controller 460 may return to FIG. 18.

On the other hand, in operation 2313, in relation to the external device, when it is determined that processing of the compressed image files is impossible, the controller 460 may process difference data of the compressed image file in operation 2323. At this time, the controller 460 may remove the difference data from the compressed image file. Alternatively, the controller 460 may recover the difference data from the compressed image file. In addition, the controller 460 may compress the difference data again. At this time, the controller 460 may compress the difference data again using an image encoder. Accordingly, the controller 460 may generate another file using a bit stream of the difference data. In addition, the controller 460 may transmit the compressed image file to the external device in operation 2325. Here, the controller 460 may transmit the compressed image file as it is. Thereafter, the controller 460 may return to FIG. 18.

According to various embodiments, the electronic device 400 may include: a first image receiver 711 including first image receiving circuitry configured to receive first image data corresponding to a first attribute parameter; a second image receiver 713 including second image receiving circuitry configured to receive second image data corresponding to a second attribute parameter; an image conversion unit 731 including image conversion circuitry configured to detect, from the received first image data, converted image data based on a difference in component between the first attribute parameter and the second attribute parameter; and image compression units 741 and 743 including compression circuitry configured to generate compressed image data for the second image data by using the converted image data.

According to various embodiments, the electronic device 400 may further include a difference detection unit 733 including difference detection circuitry configured to detect difference data by excluding converted image data from the second image data.

According to various embodiments, the image compression units 741 and 743 may include circuitry configured to compress the difference data so as to generate compressed image data.

According to various embodiments, the image conversion unit 731 may include circuitry configured to detect the converted image data from the first image data, based on the conversion scheme that corresponds to the difference component.

According to various embodiments, the first attribute parameter and second attribute parameter may include at least one of a viewing angle, a resolution, a numerical value of a color, the position of an object point, white balance, exposure, or a focus length.

According to various embodiments, the conversion scheme may include at least one of cropping, scaling, color conversion, disparity compensation, light balance compensation, exposure compensation, or focus compensation.

According to various embodiments, the image compression units 741 and 743 may include circuitry configured to compress the first image data, and generate a compressed image file using the first image data and the compressed image data.

According to various embodiments, the compressed image file may include a header region and a payload region, and the image compression units 741 and 743 may insert the compressed image data into a header region, and insert the first image data into a payload region.

According to various embodiments, the image compression file may be transferred to a network abstraction layer and have a packet structure including a plurality of packet regions, and the image compression units 741 and 743 may include circuitry configured to divide the first image data and the compressed image data and insert the same into the packet regions.

According to various embodiments, the electronic device 400 may further include a memory 450 configured to store the first image data; and a communication unit 410 including circuitry configured to store the compressed image data in an external device.

According to various embodiments, the electronic device 400 may further include: image recovery units 1710 and 1720 including circuitry configured to recover the first image data and the compressed image data; an image conversion unit 1730 including circuitry configured to detect converted image data from the recovered first image data based on the difference in component between the first and second attribute parameters; and an image detection unit 1740 including circuitry configured to add the difference data recovered from the compressed image data to the converted image data so as to detect the second image data.

According to various embodiments, an operation method for the electronic device 400 may include: receiving first image data corresponding to a first attribute parameter and second image data corresponding to a second attribute parameter; detecting converted image data from the first image data based on a difference in component between the first attribute parameter and the second attribute parameter; and generating compressed image data for the second image data by using the converted image data.

According to various embodiments, the generating of the compressed image data may include: detecting difference data by excluding the converted image data from the second image data; and compressing the difference data so as to generate compressed image data.

According to various embodiments, the detecting of the converted image data may include detecting the converted image data, from the first image data, based on a conversion scheme that corresponds to the difference in component between the first and second attribute parameters.

According to various embodiments, the first attribute parameter and second attribute parameter may include at least one of a viewing angle, a resolution, a numerical value of a color, the position of an object point, white balance, exposure, or a focus length.

According to various embodiments, the conversion scheme may include at least one of cropping, scaling, color conversion, disparity compensation, light balance compensation, exposure compensation, or focus compensation.

According to various embodiments, the operation method for the electronic device 400 may further include: compressing the first image data; generating a compressed image file using the first image data and the compressed image data; and storing the compressed image file.

According to various embodiments, the compressed image file may include a header region and a payload region, and the generating of the compressed image file may include inserting the compressed image data into the header region, and inserting the first image data into the payload region.

According to various embodiments, the image compression file may be transferred to a network abstraction layer and have a packet structure including a plurality of packet regions, and the generating of the compressed image file may include dividing the first image data and compressed image data and inserting the same into the packet regions.

According to various embodiments, the operation method for the electronic device 400 may further include: storing the first image data in the electronic device 400; and storing the compressed image data in an external device.

According to various embodiments, the operation method for the electronic device 400 may further include: recovering the first image data and the compressed image data; detecting converted image data from the first image data based on the difference in component between the first and second attribute parameters; and adding the difference data recovered from the compressed image data to the converted image data so as to detect the second image data.

According to various embodiments, the electronic device 400 may efficiently process dual image data. That is, since the electronic device 400 does not need to store both the first image data and the second image, the storage capacity in the electronic device 400 can be reduced. At this time, the electronic device may store the difference data and the first image data as one compressed image file 1700, so that the difference data and the first image data can be stored in association with each other. Accordingly, the electronic device 400 may efficiently compress the dual image data.

According to various embodiments, provided is an operation method for an electronic device, in which the electronic device includes a first camera, a second camera, and a processor, the method may include: acquiring a first image of a subject by using the first camera and a second image of the subject by using the second camera; determining, by the processor, an image conversion scheme at least partially based on a difference between a first parameter associated with the first camera and a second attribute parameter associated with the second camera; generating a converted image using the first image at least partially based on the image conversion scheme; and generating a compressed image for the second image by using the converted image.

According to various embodiments, the electronic device may efficiently process dual image data. That is, since the electronic device does not need to store both the first image data and the second image data, the storage capacity can be reduced. At this time, the electronic device my store the difference data and the first image data as one compressed image file, so that the difference data and first image data can be stored in association with each other. Accordingly, the electronic device may efficiently compress the dual image data.

Meanwhile, various example embodiments of the present disclosure illustrated and described in this disclosure and the drawings corresponding to various examples are presented to aid in understanding of technical contents of the present disclosure, and to aid in comprehension of the present disclosure, but are not intended to limit the scope of the present disclosure. That is, it will be apparent to those skilled in the art to which the present disclosure belongs that different modifications can be achieved based on the technical spirit of the present disclosure.

What is claimed is:

1. An electronic device comprising:
    a plurality of cameras comprising a first camera and a second camera;
    a memory; and
    a processor operatively connected to the memory and the plurality of cameras,
    wherein the processor is configured to:
        convert a first image, obtained by the first camera, based on a predetermined difference between an attribute parameter of the first camera and an attribute parameter of the second camera,
        identify a difference between the converted first image and at least part of a second image obtained by the second camera,
        encode the identified difference, and
        store the encoded difference with the first image in the memory.

2. The electronic device of claim 1, wherein the processor is further configured to discard, in response to the storing of the encoded difference, the first image or the second image from the memory.

3. The electronic device of claim 1, wherein the first camera and the second camera are disposed on a housing of the electronic device to make at least portion of the first FOV and the second FOV are overlapped to each other.

4. The electronic device of claim 1, wherein the processor is configured to identify at least one of a viewing angle, a resolution, a numerical value of a color, the position of an object point, white balance, exposure, and a focus length for each of the first camera and the second camera.

5. The electronic device of claim 1, wherein the processor is configured to perform, to convert the first image, at least one conversion scheme to the first image comprising cropping, scaling, color conversion, disparity compensation, light balance compensation, exposure compensation, and focus compensation.

6. The electronic device of claim 5, wherein the processor is further configured to insert data indicating the performed at least one conversion scheme into the stored difference with the first image.

7. The electronic device of claim 1, wherein the processor is further configured to:
    identify, in response to receiving request signal being associated with the first image and the second image after the storing, the stored difference with the first image stored in the memory;
    recover, in response to identifying of the stored difference with the first image, the second image from the stored difference with the first image;
    transmit, based on the received request signal, the first image and the recovered second image.

8. The electronic device of claim 1, wherein the processor is configured to:
    convert, in response to the identifying a first field-of-view (FOV) of the first image including a second FOV of the second image, the second image to he fit into the portion of the first image; and
    identify the difference based on the converted second mage and the first image.

9. The electronic device of claim 8, wherein the processor is further configured to:
    generate, in response to the identifying, data comprising a value indicating difference between a value of a first pixel of the first image and a value of a second pixel included in the converted second image.

10. The electronic device of claim 9, wherein a location of the second pixel in the converted second image is corresponds to a location of the first pixel in the first image.

11. An electronic device comprising:
    a memory; and
    a processor;
    wherein the processor is configured to;

identify a first image and a data indicating a difference between the first image and at least part of a second image;

identify the at least part of the second image based on the difference and the identified first image; and display the first image and the at least part of the second image.

12. The electronic device of claim 11, wherein the electronic device is configured to:

identify the first image and the data indicating the difference from the single file.

13. The electronic device of claim 11, wherein the electronic device is further configured to:

identifying based on the attribute parameter of the first camera and the attribute parameter of the second camera, conversion scheme associated with the first image:

converting, in response to the identifying of the conversion scheme, the first image.

14. The electronic device of claim 11, wherein the attribute parameter of the first camera and the attribute parameter of the second camera comprise at least one of: a viewing angle, a resolution, a numerical value of a color, a position of an object point, white balance, exposure, and a focus length of the first camera and the second camera.

15. The electronic device of claim 1, wherein the conversion scheme comprises at least one of: cropping, scaling, color conversion, disparity compensation, light balance compensation, exposure compensation, and focus compensation.

16. The electronic device of claim 15, further configured to:

identify, at least one conversion scheme to be performed to the first image based on data included in the first image indicating which conversion scheme is used when generating the first image.

17. The electronic device of claim 11, wherein the data indicating the difference comprising, multiple pixels correspond to the at least portion of FOV of the second image, wherein a value of each of the multiple pixels are determined based on a value of each pixels in the at least portion of FOV of the second image and the difference data.

18. An electronic device, comprising:

a memory; and a processor operatively connected to the memory, wherein the processor is configured to:

identify a first image data and a second image data from the memory wherein, the first image data and the second image data are respectively obtained by a first camera and a second camera;

identify a portion of the first image data corresponds to the second image data:

substitute, in response to the identifying the portion, the portion of the first image data for difference data indicating difference between the second image data and the portion of the first image data:

discard, in response to substitution of the portion of the first image data, the second image data being stored in the memory; and store a dual image data based on the substituted portion of the first image data.

19. The electronic device of claim 18, wherein the processor is configured to:

adjust, to substitute the portion of the first image data, a size of the second image data as a size of the portion of the first image.

20. The electronic device of claim 18, wherein the processor is further configured:

identify, in response to receiving request regarding the dual image data, the dual image data from the memory, recover, in response to the identifying the dual image data, the second image data from the identified dual image data.

* * * * *